US009684090B1

(12) United States Patent
Olsson et al.

(10) Patent No.: US 9,684,090 B1
(45) Date of Patent: Jun. 20, 2017

(54) NULLED-SIGNAL UTILITY LOCATING DEVICES, SYSTEMS, AND METHODS

(71) Applicants: Mark S. Olsson, La Jolla, CA (US); Ray Merewether, La Jolla, CA (US); Jan Soukup, San Diego, CA (US)

(72) Inventors: Mark S. Olsson, La Jolla, CA (US); Ray Merewether, La Jolla, CA (US); Jan Soukup, San Diego, CA (US)

(73) Assignee: SEESCAN, INC., San Diego, CA (US)

( * ) Notice: Subject to any disclaimer, the term of this patent is extended or adjusted under 35 U.S.C. 154(b) by 0 days.

(21) Appl. No.: 14/580,097

(22) Filed: Dec. 22, 2014

Related U.S. Application Data

(60) Provisional application No. 61/920,457, filed on Dec. 23, 2013.

(51) Int. Cl.
*G01V 3/08* (2006.01)
*G01V 3/10* (2006.01)

(52) U.S. Cl.
CPC ............... *G01V 3/083* (2013.01); *G01V 3/10* (2013.01); *G01V 2003/084* (2013.01)

(58) Field of Classification Search
CPC . G01V 3/08; G01V 3/081; G01V 3/10; G01V 3/101; G01V 3/102; G01V 3/104; G01V 3/105; G01V 3/107; G01V 3/108; G01V 3/15; G01V 3/16; G01V 3/165
See application file for complete search history.

(56) References Cited

U.S. PATENT DOCUMENTS

| 4,091,322 | A | * | 5/1978 | Stankoff | G01V 3/108 324/329 |
|---|---|---|---|---|---|
| 5,039,946 | A | * | 8/1991 | Mamontov | G01V 3/108 324/329 |
| 5,557,206 | A | * | 9/1996 | Won | G01V 3/107 324/262 |
| 5,764,127 | A | * | 6/1998 | Hore | G01V 3/10 324/345 |
| 6,700,526 | B2 | | 3/2004 | Witten | |
| 7,034,740 | B2 | | 4/2006 | Witten | |
| 7,336,078 | B1 | * | 2/2008 | Merewether | G01V 3/15 324/326 |
| 2004/0070399 | A1 | * | 4/2004 | Olsson | G01V 3/15 324/326 |
| 2004/0070535 | A1 | * | 4/2004 | Olsson | G01S 7/03 342/459 |
| 2011/0012600 | A1 | * | 1/2011 | Connor | G01V 3/105 324/326 |
| 2011/0109437 | A1 | * | 5/2011 | Olsson | G01V 3/15 340/8.1 |
| 2013/0113456 | A1 | * | 5/2013 | Pearson | G01V 3/088 324/67 |

(Continued)

FOREIGN PATENT DOCUMENTS

DE          10122741 A1 * 11/2002 ............. G01V 3/107

*Primary Examiner* — Patrick Assouad
*Assistant Examiner* — Demetrius Pretlow
(74) *Attorney, Agent, or Firm* — Steven C. Tietsworth, Esq.

(57) ABSTRACT

Nulling utility locators including a transmitter element, a sensing element, and an electronic circuit for processing signals from the transmitting element to at least partially cancel each other and determine information associated with a buried utility are disclosed.

26 Claims, 26 Drawing Sheets

(56) References Cited

U.S. PATENT DOCUMENTS

| | | | | |
|---|---|---|---|---|
| 2013/0307531 A1* | 11/2013 | Nel | ............... | G01N 27/902 |
| | | | | 324/234 |
| 2015/0077121 A1* | 3/2015 | Branson | ............ | G01V 3/081 |
| | | | | 324/326 |
| 2015/0355361 A1* | 12/2015 | Winterhalter | ...... | G01V 3/107 |
| | | | | 324/329 |

\* cited by examiner

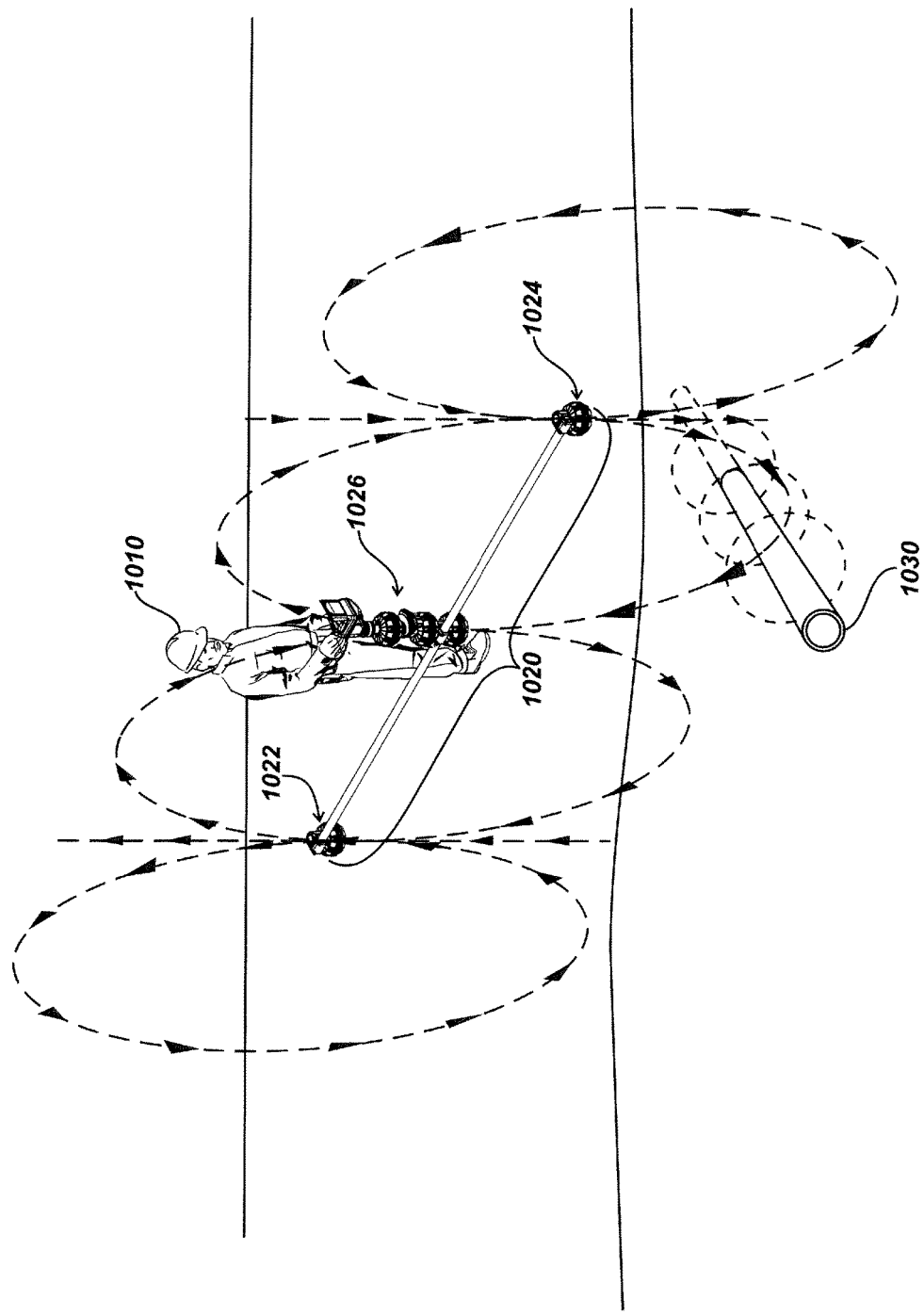

ND-SIGNAL UTILITY LOCATING
DEVICES, SYSTEMS, AND METHODS

CROSS-REFERENCE TO RELATED APPLICATIONS

This application claims priority under 35 U.S.C. §119(e) to U.S. Provisional Patent Application Ser. No. 61/920,457, filed Dec. 23, 2013, entitled NULLED-SIGNAL UTILITY LOCATING DEVICES, SYSTEMS, AND METHODS, the content of which is incorporated by reference herein in its entirety for all purposes.

FIELD

This disclosure relates generally to systems and methods for locating hidden or buried utilities. More specifically, but not exclusively, this disclosure relates to utility locator devices, systems, and methods using electronically nulled electromagnetic signals to aid in determining utility position, depth, and/or related information.

BACKGROUND

Various devices, systems, and methods of locating conductors that are buried or otherwise obscured from sight are known in the art. For example, in some applications it is desirable to locate underground utilities which are conductors or have tracing conductors located adjacent to them by sensing magnetic fields emitted by the utilities. Examples of these are buried metallic pipes or conduits, as well as non-metallic pipes, such as gas or water lines, with associated trace wires or other conductors buried along with them. In these systems, a current signal may be coupled to the utility line using an external "buried utility transmitter" (also denoted herein as a "transmitter" for brevity), may be generated inherently from current flowing in the utility (e.g., by current flowing in a buried power cable or induced from a broadcast transmitter or power lines), or may be induced onto the conductor by other sources, such as from broadcast radio signals or utility power lines.

A separate locating device, also known as a "utility locator" (also denoted herein as a "locator" for brevity), may be used to detect magnetic field signals emitted from the utility and determine positional information, such as corresponding ground surface coordinates (above the utility), orientation, and/or depth, as well as other information such as underground structure or branching, other conductors in proximity to the targeted utility, ground characteristics, current flow in the utility, and the like.

Prior art locators are not ideal in situations where the transmitter cannot be easily connected to the utility or where the approximate location of the utility is unknown. For instance, in some installations a long stretch of buried pipe lacks an exposed surface portion or stub by which to physically couple a transmitter. An example is an open field where the pipe's approximate location is unknown.

In other types of devices, a single transmitter coil oriented orthogonal to and coplanar with a single sensing antenna coil may be used to produce a nulling effect at the sensing antenna coil based on the orientation of the transmitter coil to the sensing coil. When moved or when the associated environment around these devices change, distortions of the emitted signal may reduce the signal nulling, which can then be interpreted as indicating the presence of a conductor. However, systems utilizing such devices lack resolution and/or may fail to indicate orientation and/or depth of a detected utility line or other conductor, and may further result in falsely identifying a detected conductor as a targeted utility.

Accordingly, there is a need in the art to address the above-described as well as other problems.

SUMMARY

The present disclosure relates generally to nulled-signal locating devices, systems, and methods whereby electromagnetic signal are transmitted and measured for purposes of determining a utility's location.

For example, in one aspect, the disclosure relates to a nulling utility locator. The nulling utility locator may, for example, include one or more transmitter elements. The one or more transmitter elements may include a signal generation circuit for generating a first transmit signal and a second transmit signal. The one or more transmitter elements may further include a first transmit antenna element coupled to a first output of the signal generation circuit for generating a first magnetic field signal, based on the first transmit signal, for inducing a first current flow component in a buried conductor. The one or more transmitter elements may further include a second transmit antenna element coupled to a second output of the signal generation circuit for generating a second magnetic field signal, based on the second transmit signal, for inducing a second current flow component in the buried conductor. The locator may further include one or more sensing elements. The sensing element(s) may include a magnetic field receiving antenna element. The magnetic field receiving element may be configured for receiving the first magnetic field signal, the second magnetic field signal, and a third magnetic field signal generated from the first and second current flow components in the buried conductor. The sensing element may further include an electronic circuit. The electronic circuit may be configured for processing the received first magnetic field signal and the received second magnetic field signal to at least partially cancel each other, and determining, based at least in part on the received third magnetic field signal, information associated with the buried utility.

In another aspect, the disclosure relates to a method for locating buried utilities. The method may include, for example, generating a first transmit signal and a second transmit signal in a nulling utility locator, sending the first transmit signal from a first antenna element as a first magnetic field signal to a buried utility, and sending the second transmit signal from a second antenna element as a second magnetic field signal to the buried utility. The method may further include receiving, at a magnetic field receiving antenna element, the first magnetic field signal, the second magnetic field signal, and a third magnetic field signal generated from first and second current flow components induced in the buried utility from one or more of the first and second magnetic field signals. The method may further include processing one or more outputs of the magnetic field receiving antenna element to at least partially cancel the first magnetic field signal against the second magnetic field signal. The method may include determining, based at least in part on the received third magnetic field signal, information associated with the buried utility.

In another aspect, the disclosure relates to a nulling utility locator. The nulling utility locator may include, for example, a transmitter element. The transmitter element may include a signal generation circuit for generating a transmit signal and a transmit antenna element coupled to an output of the signal generation circuit for generating a magnetic field signal, based on the transmit signal, for inducing a current flow component in a buried conductor. The locator may further include a sensing element. The sensing element may include a magnetic field receiving antenna element. The magnetic field receiving element may be configured for receiving the magnetic field signal, and a utility magnetic field signal generated from the current flow component in the buried conductor. The locator may further include an electronic circuit. The electronic circuit may be configured for processing the magnetic field signal to at least partially attenuate it with respect to the utility magnetic field signal. The electronic circuit may be further configured for determining, based at least in part on the received utility magnetic field signal, information associated with the buried utility.

In another aspect, the disclosure relates to a method for locating buried utilities. The method may include, for example, generating a transmit signal in a nulling utility locator. The method may further include sending the transmit signal from an antenna element as a first magnetic field signal to a buried utility. The method may further include receiving, at a magnetic field receiving antenna element, the magnetic field signal and a buried utility magnetic field signal generated from a current flow components induced in the buried utility from the magnetic field signal. The method may further include processing one or more outputs of the magnetic field receiving antenna element to at least partially cancel the magnetic field signal relative to the buried utility magnetic field signal. The method may further include determining, based at least in part on the received buried utility magnetic field signal, information associated with the buried utility.

Various additional aspects, features, and functionality are further described below in conjunction with the appended Drawings.

BRIEF DESCRIPTION OF THE DRAWINGS

The present application may be more fully appreciated in connection with the following detailed description taken in conjunction with the accompanying drawings, wherein:

FIG. 10B is another illustration of a nulled-signal locating device embodiment in use.

DETAILED DESCRIPTION OF EMBODIMENTS

Overview

Figure 1A:
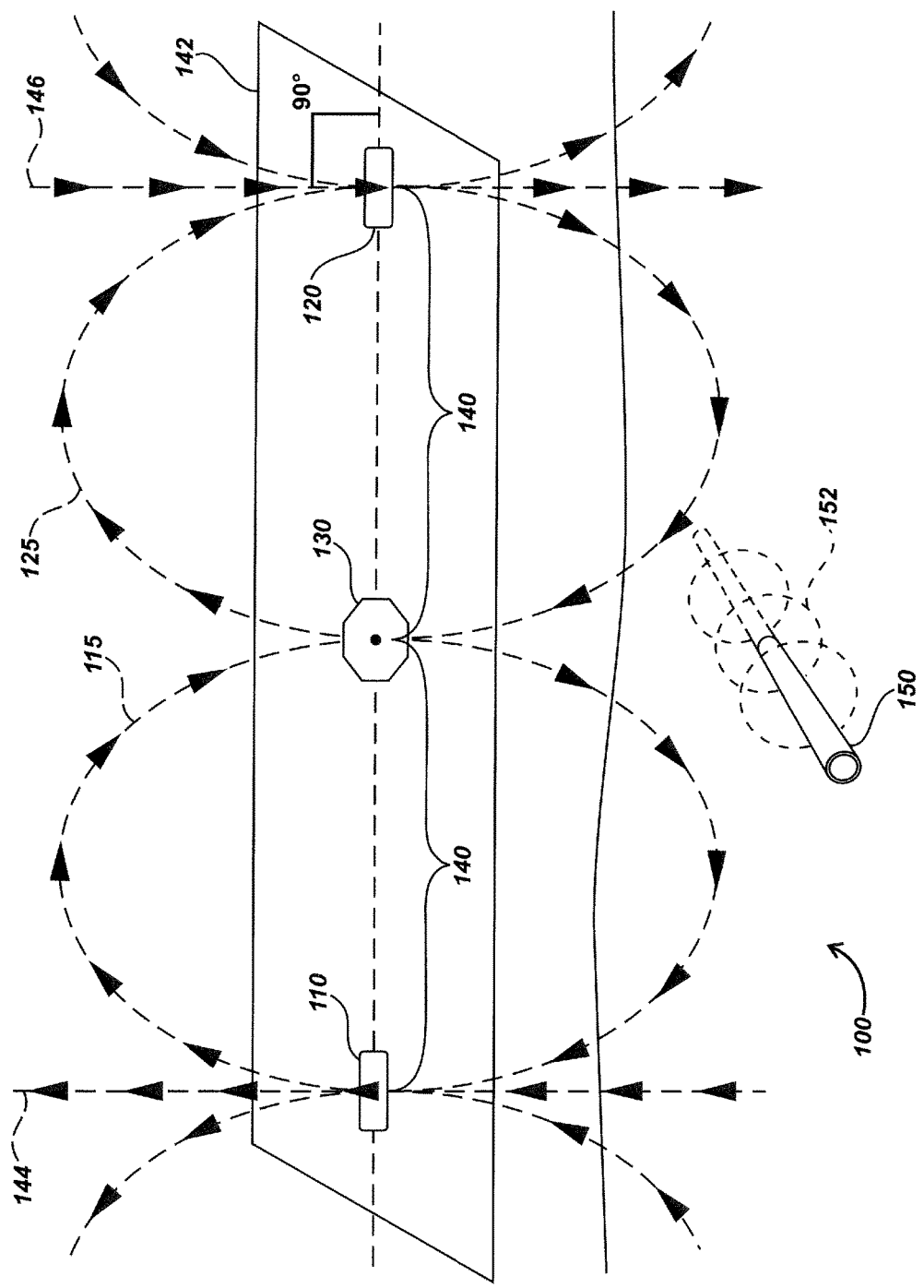
FIG. 1A is an illustration of an embodiment of a nulled-signal locating device.

The present disclosure relates generally to systems and methods for locating hidden or buried utilities. More specifically, but not exclusively, this disclosure relates to utility locator devices, systems, and methods using electronically nulled electromagnetic signals to aid in determining utility position, depth, and/or related information.

A nulled-signal locating device or "nulling locator," as used herein, is a device comprised of one or more transmitting elements and at least one sensing element, where output magnetic field signals from the transmitting element(s) are nulled or canceled at a point or node associated with the sensing element. Nulling of signal(s) may be implemented electronically and/or within software and/or through physical geometry of sensing and transmitting elements. For example, a nulled-signal locating device embodiment including at least one sensing element and at least one transmitting element may utilize electronics for signal nulling, which may include introducing a separate nulling signal within the sensing element. Alternatively or in addition to electronic signal nulling, signal nulling may be implemented in software.

In some embodiments where software nulling is employed, the output of one or more filters may be set to indicate a nulled value. Any changes from the sensed signal set to the nulled value may indicate the presence of a buried utility or other conductor. In further embodiments where one or more opposing pairs of transmitting elements and at least one sensing element are used, signal nulling may occur through the physical geometry of transmitting and sensing elements. In such embodiments, each transmitting element may be located equidistant from the sensing element and on a shared plane with the sensing element.

The sensing element may be located centrally between the transmitting elements in a predefined geometry selected for geometric nulling. One transmitting element may be configured to produce an oppositely phased but otherwise identical signal to that of the other transmitting element such that, to the extent possible, a nulling of signals may occur in the area located centrally between the transmitting elements and occupied by the sensing element. Nulled signals may cancel at a sensing node or point of the sensing element.

In the presence of a conductor, which may be a buried utility line, current signal may be induced onto the conductor. The resultant field may be measured by the sensing element and be used to derive position and orientation of the target utility or other conductor. In additional embodiments, combinations of the aforementioned signal nulling methods and technologies may be used (e.g., combinations of software and/or electronic and/or signal nulling through the device's physical geometry). For example, a nulled-signal locating device with opposing pair(s) of transmitting elements not equidistant from one or more sensing elements may in part use the geometry of the transmitting elements to null the signals as well as software and/or electronic methods to null signals. In further embodiments comprised of multiple sensing elements, the separate sensing elements may use differing signal nulling methods in software and hardware/electronics to null signals.

In another aspect, the sensing element(s) may include one or more sensing antenna coils. Some embodiments may be configured with an array of sensing antenna coils in various different geometries. For example, an omnidirectional and/or gradient antenna array(s) may be used.

In another aspect, multiple antenna coil arrays may be used which may, for example, be used to determine depth of a sensed utility. In such embodiments, other antenna and/or antenna arrays may be offset from the nulled-signal location and signal nulling may be implemented in software.

In another aspect, the sensing element may be the antenna coil array(s) of a utility locator device, where the nulled-signal locating device is built into a utility locator device.

In another aspect, the nulled-signal locating device may be an attachment accessory for a utility locator device. For instance, transmitting elements may attach to opposite ends of a horizontally oriented mast that may further be secured to a utility locator device. Such a utility locator device may further be configured to power and otherwise interface with circuitry on such a nulled-signal locating device accessory attachment embodiment. In another aspect, each transmitting element may include a high-Q tuned circuit. In another aspect, the signals of the transmitting elements may be phase locked with a sensing element which may be a utility locator device.

In another aspect, one or more pairs of opposing transmitting elements may be used. In such embodiments, different frequencies may be used by each pair. In another aspect, a time multiplexing method may be used, wherein frequencies may be switched over time such that each transmitting element of the pair may always transmit a signal that is oppositely phased but otherwise identical (e.g., in amplitude).

In another aspect, a locating device in keeping with the present disclosure may be configured with and/or to operate with a variety of sensors and/or other technologies. For instance, inertial navigation sensors, global navigation sensors (e.g., GPS, GLONASS, Galileo, etc.), optical sensors, communication technologies (e.g., WLAN, ISM, etc.) and the like.

In another aspect, the transmitting elements may be phase locked to each other. In another aspect, the transmitting elements may be free running at separate frequencies. In another aspect, the transmitted signal(s) may have a known phase relationship to the sensing element(s). In another aspect, phase encoding may be part of the transmitted signal(s).

In another aspect, a nulled-signal locating device in keeping with the present disclosure may be part of a larger utility locating system. For example, a nulled-signal locating device may be configured to operate in cooperation with and communicate with other utility locator devices, mapping systems, other transmitters, pipe sondes, base stations, laptop computers, and/or smart phones, and/or other devices/technologies.

The disclosures herein may be combined in various embodiments with the disclosures in co-assigned patents and patent applications, including transmitter and locator devices and associated apparatus, systems, and methods, as are described in U.S. Pat. No. 7,009,399, entitled OMNI-DIRECTIONAL SONDE AND LINE LOCATOR, issued Mar. 7, 2006; U.S. Pat. No. 7,276,910, entitled A COMPACT SELF-TUNED ELECTRICAL RESONATOR FOR BURIED OBJECT LOCATOR APPLICATIONS, issued Oct. 2, 2007; U.S. Pat. No. 7,288,929, entitled INDUCTIVE CLAMP FOR APPLYING SIGNAL TO BURIED UTILITIES, issued Oct. 30, 2007; U.S. Pat. No. 7,443,154, entitled MULTI-SENSOR MAPPING OMNIDIRECTIONAL SONDE AND LINE LOCATOR, issued Oct. 28, 2008; U.S. Pat. No. 7,518,374, entitled RECONFIGURABLE PORTABLE LOCATOR EMPLOYING MULTIPLE SENSOR ARRAY HAVING FLEXIBLE NESTED ORTHOGONAL ANTENNAS, issued Apr. 14, 2009; U.S. Pat. No. 7,619,516, entitled SINGLE AND MULTI-TRACE OMNIDIRECTIONAL SONDE AND LINE LOCATORS AND TRANSMITTERS USED THEREWITH, issued Nov. 17, 2009; U.S. Pat. No. 7,825,647, entitled COMPACT LINE ILLUMINATOR FOR LOCATING BURIED PIPES AND CABLES, issued Nov. 2, 2010; U.S. Pat. No. 7,990,151, entitled TRIPOD BURIED LOCATOR SYSTEM, issued Aug. 2, 2011; U.S. Pat. No. 8,248,056, entitled A BURIED OBJECT LOCATOR SYSTEM EMPLOYING AUTOMATED VIRTUAL DEPTH EVENT DETECTION AND SIGNALING, issued Aug. 21, 2012; U.S. Pat. No. 8,264,226, entitled SYSTEM AND METHOD FOR LOCATING BURIED PIPES AND CABLES WITH A MAN PORTABLE LOCATOR AND A TRANSMITTER IN A MESH NETWORK, issued Sep. 11, 2012; U.S. patent application Ser. No. 13/570,211, entitled PHASE-SYNCHRONIZED BURIED OBJECT LOCATOR APPARATUS, SYSTEM, AND METHODS, filed Aug. 8, 2012; U.S. patent application Ser. No. 13/851,951, entitled DUAL ANTENNA SYSTEMS WITH VARIABLE POLARIZATION, filed Mar. 27, 2013; U.S. patent application Ser. No. 13/469,024, entitled BURIED OBJECT LOCATOR APPARATUS AND SYSTEMS, filed May 10, 2012; U.S. patent application Ser. No. 13/676,989, entitled QUAD-GRADIENT COILS FOR USE IN A LOCATING SYSTEM, filed Nov. 11, 2012; and U.S. patent application Ser. No. 14/332,268, entitled UTILITY LOCATOR TRANSMITTER DEVICES, SYSTEMS, AND METHODS WITH DOCKABLE APPARATUS, filed on Jul. 15, 2014. The content of each of these applications is incorporated by reference herein in its entirety (these applications may be collectively denoted herein as the "incorporated applications").

In some embodiments a utility locator as described herein may be configured to be in communications with a mobile base station such as, for example, is described in co-assigned U.S. patent application Ser. No. 14/446,145, filed Jul. 29, 2014, entitled UTILITY LOCATING SYSTEM WITH MOBILE BASE STATION, the content of which is incorporated by reference herein in its entirety.

For example, in one aspect, the sensing element(s) may include one or more sensing antenna coils. Some embodiments may be configured with an array of sensing antenna coils arranged in various geometries. For example, an omnidirectional and/or gradient antenna array(s) may be used. Details of various antenna array configurations may be found in the incorporated patents and patent applications.

In another aspect, multiple antenna coil arrays may be used which may, for example, be used to determine depth of a sensed utility. In such embodiments, other antenna coils and/or antenna arrays may be offset from the nulled-signal location and signal nulling may be implemented in software.

In another aspect, the sensing element may be the antenna coil array(s) of a utility locator device where the nulled-signal locating device is built into a utility locator device. For example, the various utility locator devices in the incorporated patents and patent applications may further be configured for use as a nulled-signal locating device.

In another aspect, a nulled-signal locating device may be an attachment accessory for a utility locator device. For instance, transmitting elements may attach to opposite ends of a horizontally oriented mast that may further be secured to the utility locator device. Such a utility locator device may further be configured to power and otherwise interface with circuitry on such a nulled-signal locating device accessory attachment embodiment.

In another aspect, each transmitting element may include a high Q tuned circuit. Aspects of high Q tuned circuits as may be used are disclosed in U.S. Pat. No. 8,013,610, entitled HIGH Q SELF-TUNING LOCATING TRANSMITTER, issued Sep. 6, 2011, the content of which is incorporated by reference herein in its entirety.

In another aspect, the signals of the transmitting elements may be phase locked with a sensing element, which may be a utility locator device. Such phase locking may be implemented using the various details as described in U.S. patent application Ser. No. 13/570,211, entitled PHASE SYNCHRONIZED BURIED OBJECT LOCATOR APPARATUS, SYSTEMS, AND METHODS, filed Jun. 9, 2013, the content of which is incorporated by reference herein in its entirety.

In another aspect, more than one pair of transmitting elements may be used. In such embodiments, different frequencies may be used by each pair.

In another aspect, a time multiplexing method may be used, whereby frequencies may be switched over time such that each transmitting element of the pair may be made to always transmit a signal that is oppositely phase but otherwise identical in magnitude. Some example time multiplexing or frequency switching methods that may be used are disclosed in co-pending U.S. patent application Ser. No. 13/676,989, entitled QUAD-GRADIENT COILS FOR USE IN LOCATING SYSTEMS, filed Nov. 14, 2012; U.S. patent application Ser. No. 13/850,181, entitled QUAD-GRADIENT COILS FOR USE IN LOCATING SYSTEMS, filed Mar. 25, 2013, and U.S. patent application Ser. No. 13/894,038, entitled OMNI-INDUCER TRANSMITTING DEVICES AND METHODS, filed May 14, 2013. The content of each of these applications are incorporated by reference herein in their entirety.

In another aspect, a locating device in keeping with the present disclosure may be configured with and/or to operate with a variety of sensors and/or other devices. For example, inertial navigation sensors, global navigation sensors (e.g., GPS, GLONASS, Galileo, etc.), optical sensors, communication technologies (e.g., WLAN, ISM, etc.) and the like.

In another aspect, the transmitting elements may be phase locked to each other.

In another aspect, the transmitting elements may be free running at separate frequencies.

In another aspect, the transmitted signal(s) may be generated to have a known phase relationship to the sensing element(s).

In another aspect, phase encoding may be included in the transmitted signal(s).

In another aspect, a locating device in keeping with the present disclosure may be part of a larger utility locating system. For instance, a nulled-signal locating device may be configured to operate in cooperation with and communicate with other utility locator devices, mapping systems, other transmitters, pipe sondes, base stations, laptop computers, and/or smart phones. Other system device and/or technologies may further be configured as part of a larger nulled-signal locating system.

In another aspect, the disclosure relates to a nulling utility locator. The nulling utility locator may, for example, include one or more transmitter elements. The one or more transmitter elements may include a signal generation circuit for generating a first transmit signal and a second transmit signal. The one or more transmitter elements may further include a first transmit antenna element coupled to a first output of the signal generation circuit for generating a first magnetic field signal, based on the first transmit signal, for inducing a first current flow component in a buried conductor. The one or more transmitter elements may further include a second transmit antenna element coupled to a second output of the signal generation circuit for generating a second magnetic field signal, based on the second transmit signal, for inducing a second current flow component in the buried conductor.

Figure 15:
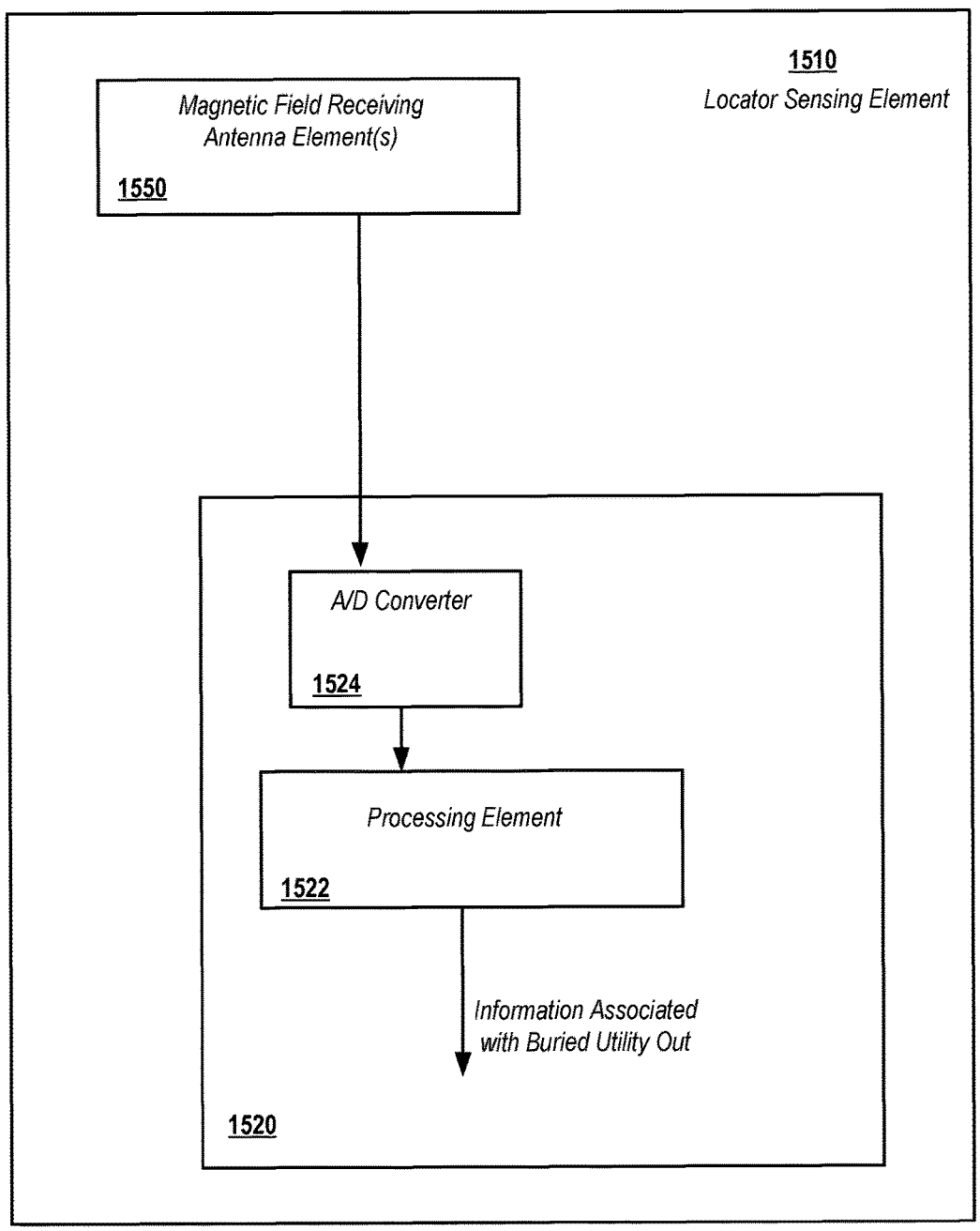
FIG. 15 is a diagram illustrating a sensing element with an electronic circuit including a processing element.

The locator may, for example, further include one or more sensing elements such as, for example, sensing element 1510 of FIG. 15. The sensing element(s) may include a magnetic field receiving antenna element such as, for example, magnetic field receiving element 1550 as shown in FIG. 15. The magnetic field receiving element may be configured for receiving the first magnetic field signal, the second magnetic field signal, and a third magnetic field signal generated from the first and second current flow components in the buried conductor. The sensing element may further include an electronic circuit such as, for example, electronic circuit 1520 as shown in FIG. 15. The electronic circuit may be configured for processing the received first magnetic field signal and the received second magnetic field signal to at least partially cancel each other, and determining, based at least in part on the received third magnetic field signal, information associated with the buried utility.

The signal generation circuit may, for example, be integral with the first transmit antenna element, the second transmit antenna element, or both transmit antenna elements. The signal generation circuit may include a first signal generation element coupled to the first transmit antenna element and a second signal generation element coupled to the second transmit antenna element. The second transmit signal may be generated to be approximately 180 degrees out of phase with the first transmit signal. The first transmit antenna and the second transmit antenna may be configured so that the second magnetic field signal is radiated so as to be approximately 180 degrees out of phase with the first magnetic field signal. The first transmit antenna and the second transmit antenna may be magnetic field dipole antennas. The first transmit antenna and the second transmit antenna may be equally spaced from and/or coplanar with the magnetic field receiving antenna element. The magnetic field receiving antenna element may be an omnidirectional magnetic field antenna array.

The electronic circuit may, for example, include an analog-to-digital converter such as, for example, A/D converter 1524 as shown in FIG. 15, for converting one or more output signals from the magnetic field receiving antenna element to one or more digital signals. The electronic circuit may further include a processing element such as, for example, processing element 1522 as shown in FIG. 15. The processing element may be configured to at least partially cancel digital signal components of the first magnetic field signal and the second magnetic field signal by nulling, and process digital signal components of the received third magnetic field signal to determine the information associated with the buried utility. The information associated with the buried utility may include positional information. The positional information may include terrestrial coordinate information. The terrestrial coordinate information includes latitude/longitude information. The positional information may include depth information. The information associated with the buried utility may include current flow magnitude information associated with a current flow in the buried utility. The information associated with the buried utility may include current flow phase or directional information associated with a current flow in the buried utility.

The locator may, for example, further include a secondary sensing element coupled to the electronic circuit. The electronic circuit may be configured to determine depth information associated with the buried utility based at least in part on an output signal from the secondary sensing element.

The locator may, for example, include an output device for providing an output corresponding to the determined information associated with the buried utility. The output device may be a visual display device and the determined information is presented on a graphical display. The determined information may include an estimated position of the buried utility. The determined information may include an estimated depth of the buried utility. The output device may include an audible output device. The determined information may include an estimated position of the buried utility and the estimated position may be presented audibly. The determined information may include an estimated depth of the buried utility and the estimated depth may be presented audibly. The output device may include a haptic feedback device. The determined information may include an estimated position of the buried utility and the estimated position may be presented as tactile information to a user. The determined information may include an estimated depth of the buried utility and the estimated depth may be presented as tactile information to a user.

The locator may, for example, include one or more secondary sensing elements.

One or more of the transmit antenna elements may, for example, be transmitter coils. The first and second transmit antenna elements may be transmitter coils. The first and second transmit antennas may be wired in series. The first and second transmit antenna elements may be wound in opposite directions. The first and second transmit antenna elements may be coils would in opposite directions and may have opposite polarity.

The locator may, for example, be configured as a utility locator device and a nulled-signal transmitter attachment device. The nulled signal transmitter attachment device may be configured to be removably attached to the utility locator device.

The locator may, for example, further include a GPS or other positioning system module. The GPS or other positioning system module may be coupled to the electronic circuit for providing positioning and/or time information.

The locator may, for example, further include a wireless communications module. The wireless communications module may be coupled to the electronic circuit and/or to other circuit elements or modules. The wireless communications module and coupled modules may be configured to send and/or receive data from an external device or system. The external device or system may be an external device with Wi-Fi or Bluetooth modules. The external device or system may be a cellular phone or tablet device. The external device or system may be a notebook computer. The external device or system may be a second utility locator. The external device or system may be a mobile base station. The locator may be configured to receive positioning and/or data communications signals from the mobile base station. The external device or system may be a buried utility transmitter device. The wireless communications module may be a cellular data communications module. The wireless communications module may be a Wi-Fi or Bluetooth wireless communications module. The wireless communications module may be an ISM—band module.

The locator may, for example, further include an intelligent battery dock. The locator may further include an intelligent battery. The intelligent battery may be coupled to the intelligent battery dock.

The first and/or second transmit signals may, for example, include encoded data or information. The encoded data or information may be encoded using phase modulation. The encoded data or information may be encoded using amplitude modulation. The encoded data or information may be encoded using phase, amplitude, and/or frequency modulation, alone or in combination. The locator may further include a module in the sensing element for decoding the encoded data or information.

The locator may, for example, include a horizontal crossbar element. The horizontal crossbar element may be coupled to a utility locator element. The horizontal crossbar element may include one or more flexible/adjustable or rigid joints. The horizontal crossbar element may be configured to be coupled to a vertical mast.

The first and/or second magnetic field signals may, for example, be generated at two or more frequencies.

In another aspect, the disclosure relates to a method for locating buried utilities. The method may include, for example, generating a first transmit signal and a second transmit signal in a nulling utility locator, sending the first transmit signal from a first antenna element as a first magnetic field signal to a buried utility, and sending the second transmit signal from a second antenna element as a second magnetic field signal to the buried utility. The method may further include receiving, at a magnetic field receiving antenna element, the first magnetic field signal, the second magnetic field signal, and a third magnetic field signal generated from first and second current flow components induced in the buried utility from one or more of the first and second magnetic field signals. The method may further include processing one or more outputs of the magnetic field receiving antenna element to at least partially cancel the first magnetic field signal against the second magnetic field signal. The method may include determining, based at least in part on the received third magnetic field signal, information associated with the buried utility.

In another aspect, the disclosure relates to a nulling utility locator. The nulling utility locator may include, for example, a transmitter element. The transmitter element may include a signal generation circuit for generating a transmit signal and a transmit antenna element coupled to an output of the signal generation circuit for generating a magnetic field signal, based on the transmit signal, for inducing a current flow component in a buried conductor. The locator may further include a sensing element. The sensing element may include a magnetic field receiving antenna element. The magnetic field receiving element may be configured for receiving the magnetic field signal, and a utility magnetic field signal generated from the current flow component in the buried conductor. The locator may further include an electronic circuit. The electronic circuit may be configured for processing the magnetic field signal to at least partially attenuate it with respect to the utility magnetic field signal. The electronic circuit may be further configured for determining, based at least in part on the received utility magnetic field signal, information associated with the buried utility.

In another aspect, the disclosure relates to a method for locating buried utilities. The method may include, for example, generating a transmit signal in a nulling utility locator. The method may further include sending the transmit signal from an antenna element as a first magnetic field signal to a buried utility. The method may further include receiving, at a magnetic field receiving antenna element, the magnetic field signal and a buried utility magnetic field signal generated from a current flow components induced in the buried utility from the magnetic field signal. The method may further include processing one or more outputs of the magnetic field receiving antenna element to at least partially cancel the magnetic field signal relative to the buried utility magnetic field signal. The method may further include determining, based at least in part on the received buried utility magnetic field signal, information associated with the buried utility.

Various additional aspects, features, and functions are described below in conjunction with FIGS. 1 through 14 of the appended Drawings.

It is noted that as used herein, the term, "exemplary" means "serving as an example, instance, or illustration." Any aspect, detail, function, implementation, and/or embodiment described herein as "exemplary" is not necessarily to be construed as preferred or advantageous over other aspects and/or embodiments.

The following exemplary embodiments are provided for the purpose of illustrating examples of various aspects, details, and functions of the present disclosure; however, the described embodiments are not intended to be in any way limiting. It will be apparent to one of ordinary skill in the art that various aspects may be implemented in other embodiments within the spirit and scope of the present disclosure.

Example Nulled-Signal Locating Devices, Systems, and Methods

Turning to FIG. 1A, a nulling locator embodiment 100 in accordance with aspects of the present disclosure is illustrated. Locator 100 may include a first transmitter element 110 and a second transmitter element 120. The transmitter elements may be positioned at predefined spacing so as to facilitate nulling or cancellation of certain received signals to aid in detection of hidden or buried utilities or other conductors.

The transmitter elements may include magnetic field antennas or antenna element arrays, such as, for example, magnetic dipole antennas, and may include or may be coupled to associated signal generation electronics such as oscillators, phase-locked loops, amplifiers, control circuits, processing elements, and the like to generate and control generated magnetic field signals. For example, in one embodiment separate transmitter elements may generate and radiate magnetic field signals, such as from elements 110 and 120 as shown. Alternately, other embodiments may combine signal generation in a single element, with separate outputs coupled to separate transmit antenna elements. One example of this configuration is a single signal generation element having a first output for coupling a first transmit signal to a first antenna (e.g., similar to element 110 of FIG. 1A) and a second output for coupling a second transmit signal to a second antenna (e.g., similar to element 120 of FIG. 1A). Various other configurations may be used to generate transmit signals, couple them to corresponding magnetic field antennas, such as magnetic dipole antennas, and radiate magnetic field signals from the antennas for inducement of currents in buried utilities or other conductors.

One or more sensing elements, such as sensing element 130 as shown, may be positioned between transmitter elements 110 and 120. The sensing element or elements may include magnetic field antennas or antenna element arrays, such as one or more omnidirectional magnetic field receive antennas, and may be included in or coupled to corresponding electronics such as receiver signal conditioning circuits, amplification circuits, and processing elements such as analog and/or digital electronics, processing elements, memory, and the like to process received signals and generate, display, store, and/or transmit determined utility positional information. The sensing elements may have one or more outputs coupled back to the transmitter elements to provide feedback for control of generated signals at the transmitter elements.

In an exemplary embodiment, the positioning of the transmitter and sensing elements may be such that the first transmitter element 110 and second transmitter element 120 are at a substantially equal distance 140 in a common plane 142 from the sensing element 130. Other embodiments may have alternate spacing, number of transmit or sensing elements, and/or corresponding signal processing to provide similar or equivalent nulling functionality.

Transmitting elements 110 and 120 may have corresponding dipole axes oriented such as axis 144 and axis 146 as shown. The dipole axes 144 and 146 may be approximately parallel to each other and orthogonal to the common plane 142.

In an exemplary embodiment, the first transmitter element 110 and the second transmitter element 120 may be configured to produce identical magnitude but oppositely phased magnetic field signals (relative to each other and as shown by the arrows in signals 115 and 125 of FIG. 1A). For example, the first transmitter element 110 may produce signal 115 and the second transmitter element 120 may be configured to produce signal such as signal 125. These signals may then induce current flow in utilities in the vicinity, such as utility 150 as shown, which may then corresponding emit magnetic field signals such as signals 152 as shown. Based on geometry of the transmit and sensing elements, and/or associated signal processing circuitry, direct magnetic fields at the sensing element 130 from the transmitting elements may be cancelled or nulled, in whole or in part, so as to aid in reception of other received magnetic field signals, such as signals emitted from buried utilities either from inherent magnetic field signal generation or magnetic fields from induced current flow such as from magnetic fields generated by the transmitter elements.

For example, the received signal component from the transmitter elements 110 and 120 may directly cancel based on geometry and/or may be processed, such as, for example, in a processing element such as processing element 1522 of FIG. 15, which may be integrated with or coupled to the sensing element 130, to null or cancel signals 115 or 125, either fully or partially. At the same time, other received signals, such as signal 152 emitted from utility line 150, which are typically of much lower amplitude than signals 115 and 125, may be processed to determine utility positional and/or other related information. Put another way, the transmitter elements 110 and 120 may generate relatively strong magnetic field signals 115 and 125 (and/or additional signals from one or more additional transmitter elements not shown), respectively, that induce current flow in adjacent conductors (e.g., utility 150, for example, as shown), with the induced currents generating corresponding magnetic field signals 152. At sensing element 130, which may correspond with sensing element 1520 of FIG. 15, signals 115 and 125 are cancelled or nulled, either in hardware or software, to fully or partially cancel each other, while signal 152 (and/or other received signals) are passed through and processed to determine positional information, which may be done, for example, as described in the various co-assigned applications incorporated by reference herein.

The sensing element 130 may include one or more sensing antenna coils. Some embodiments may be configured with an array of sensing antenna coils in various different geometries. For example, various aspects of antenna coils, arrays, and array geometries that may be used in conjunction with the disclosures herein in various embodiments are described in co-assigned U.S. Pat. No. 7,009,399, entitled OMNIDIRECTIONAL SONDE AND LINE LOCATOR, issued Mar. 7, 2006, U.S. Pat. No. 7,443,154, entitled MULTI-SENSOR MAPPING OMNIDIRECTIONAL SONDE AND LINE LOCATOR, issued Oct. 28, 2008, U.S. Pat. No. 7,619,516, entitled SINGLE AND MULTI-TRACE OMNIDIRECTIONAL SONDE AND LINE LOCATORS AND TRANSMITTERS USED THEREWITH, issued Nov. 17, 2009, United States Patent entitled OMNIDIRECTIONAL SONDE AND LINE LOCATOR, issued Mar. 7, 2006, U.S. patent application Ser. No. 13/676,989, entitled QUAD-GRADIENT COILS FOR USE IN A LOCATING SYSTEM, filed Nov. 11, 2012, and U.S. patent application Ser. No. 13/469,024, entitled BURIED OBJECT LOCATOR APPARATUS AND SYSTEMS, filed on May 10, 2012. The content of each of these applications is incorporated by reference herein in its entirety.

The sensing element may include or interface with one or more separate output elements (not illustrated), which may indicate to a user information regarding a sensed utility. For instance, output elements in the form of audible output devices (e.g., speakers, headphones, piezo-electric devices, etc.), visual displays for providing a graphical user interface and/or user touch-screen input, haptic feedback devices, and/or other output, user interface, storage, or data transmission capabilities may be used. In some embodiments, as discussed subsequently herein, a utility locator device, such as those described in the various incorporated patent and patent applications previously referenced herein, may be configured partially or fully as the sensing element(s) and/or indicator element(s) described herein.

Figure 1B:
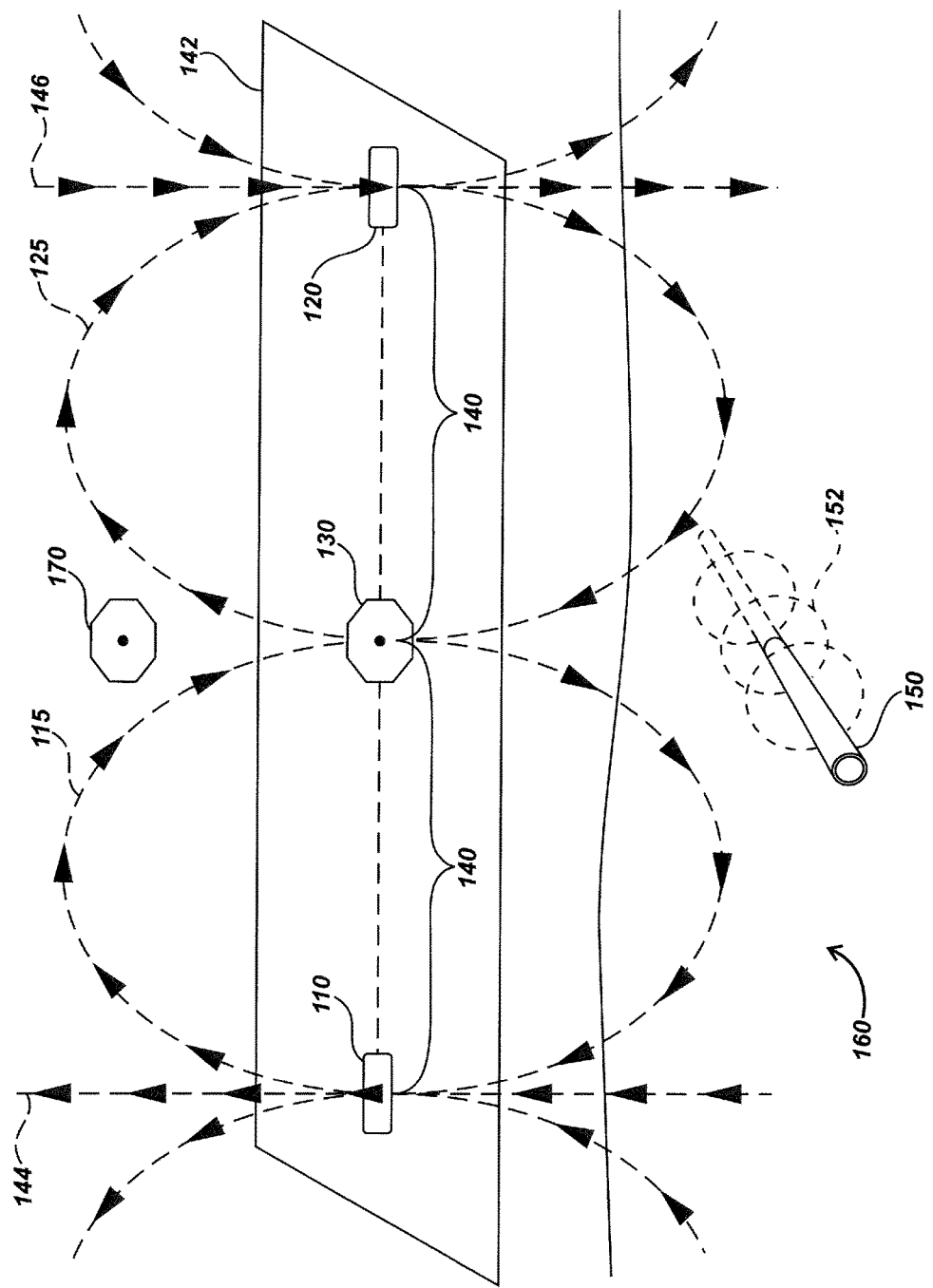
FIG. 1B is an illustration of an embodiment of another nulled-signal locating device.

Turning to FIG. 1B, an alternative nulled-signal locating device embodiment 160 is illustrated. This locator embodiment may include aspects of the nulled-signal locating device 100 with the addition of one or more secondary sensing elements 170, which may include various combination of antenna coils and array configurations as previously described herein. The secondary sensing element 170 may, for instance, be a magnetic field antenna or antenna array and associated circuitry and processing elements configured for depth correction calculation of a sensed utility or other conductor. Example of such correction implementations are described in, for example, embodiments in the incorporated applications, such as U.S. patent application Ser. No. 13/676,989. The secondary sensing element 170 may be offset from the location of the nulled signals 115 and 125 occupied by the sensing element 130 in such embodiments, and nulling of sensed signals may be done in such implementations in software and associated circuitry and processing elements.

Referring to FIGS. 1A and 1B, transmitter elements 110 and 120 may include one or more transmitting coils or multi-dimensional coil arrays that may be configured to produce signal such that signals received directly at one or more sensing elements are substantially equal in magnitude but opposite in phase at frequencies used for utility location (also denoted as "active frequencies" herein). For instance, the transmitting coils may be configured to produce signals at active frequencies of 80 and/or 480 kHz.

In some embodiments, the transmitter coils may be components of high Q (quality factor) tuned circuits. Aspects of high Q tuned circuits and high Q transmitter devices as may be used in embodiments in conjunction with the disclosures herein are disclosed in co-assigned U.S. Pat. No. 8,013,610, entitled HIGH Q SELF-TUNING LOCATING TRANSMITTER, issued Sep. 6, 2011, the content of which is incorporated by reference herein in its entirety. In some embodiments, the transmitting coils may be phase locked with a sensing element such as sensing element 130, such as through a feedback coupled circuit. Aspects of phase locking methods and technologies as may be used in embodiments in conjunction with the disclosures herein are described in co-assigned U.S. patent application Ser. No. 13/570,211, entitled PHASE SYNCHRONIZED BURIED OBJECT LOCATOR APPARATUS, SYSTEMS, AND METHODS, filed Jun. 9, 2013, the content of which is incorporated by reference herein in its entirety.

In some embodiments, such as those illustrated and described in connection with FIGS. 1A and 1B, the nulling of signals may fully or partially be achieved through use of particular physical geometry of the transmitting elements and receiving elements. For example, similar or coupled transmitter element signal generating circuits may have outputs coupled to similar antenna coils, and may provide, at a predetermined sensing element point, substantially nulled or cancelled magnetic field signal components, such as shown in FIG. 1A and FIG. 1B. Additional nulling may also be implemented through software and/or through electronic nulling methods. In other embodiments, software and/or electronic nulling methods may solely be used to null the transmitted signal(s) without relying upon the physical geometry of the transmitting and sensing elements.

Figure 1C:
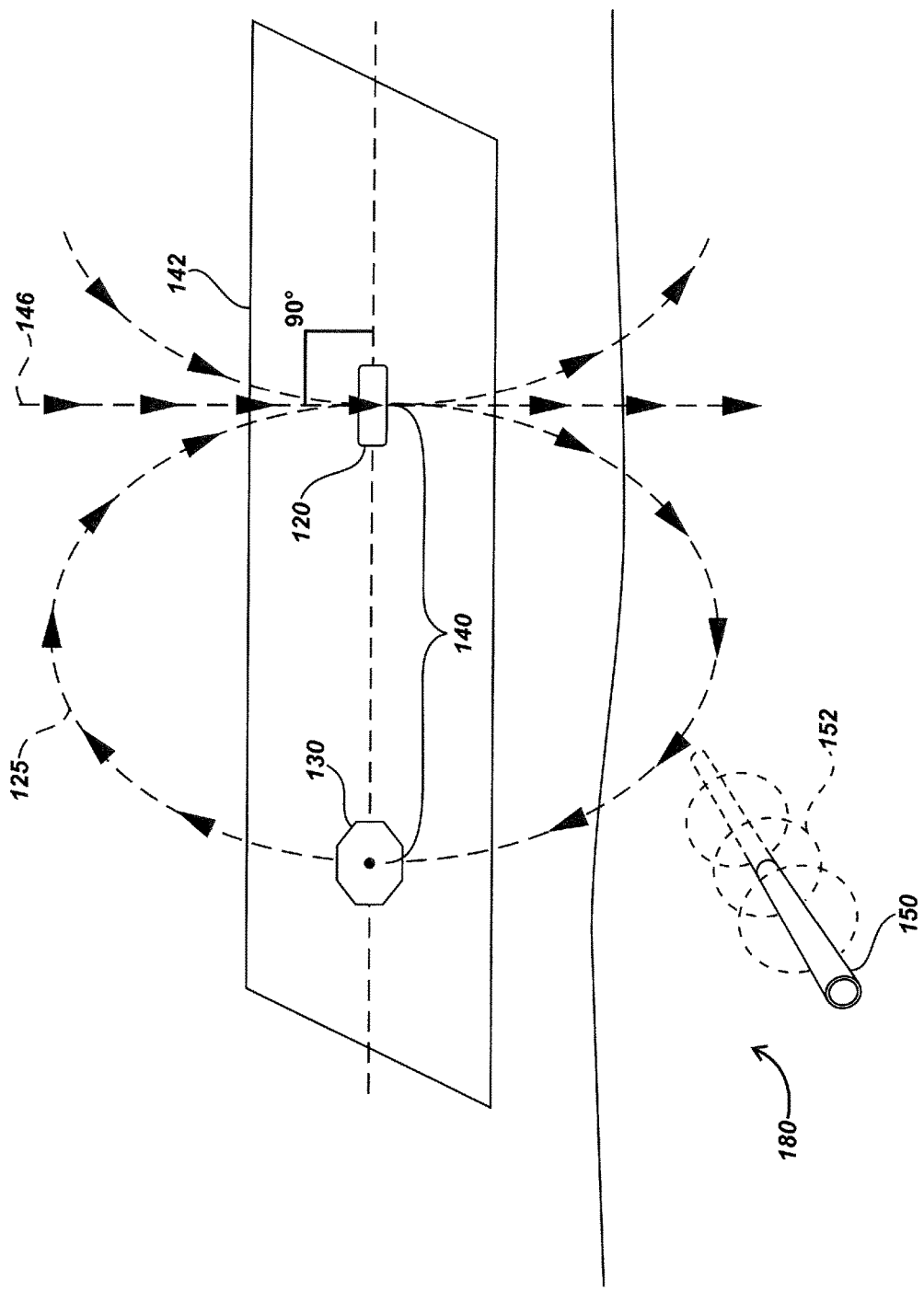
FIG. 1C is an illustration of an embodiment of another nulled-signal locating device.

For example, as illustrated in FIG. 1C, a nulled-signal locating device in accordance with aspect of the present disclosure, such as the nulled-signal locating device 180, need not have multiple transmitting elements but rather may have a single transmitter element as shown. Nulling of signal(s) in such embodiments may be done electronically and/or within software, thus permitting such embodiments to include at least one single sensing element and transmitting element. For instance, the nulled-signal locating device 180 includes one sensing element 120 and one transmitting element 130 as shown. Signals may be nulled using electronic nulling or signal cancellation methods, such as whereby a separate nulling signal is produced within the sensing element 120. Alternatively, or in addition to electronic methods, signal nulling be implemented in software. For example, the output of one or more filters may be set to indicate a null value and the sensing of a signal other than one equivalent to the null value signal may indicate the presence of a buried utility or other conductor.

Figure 2:
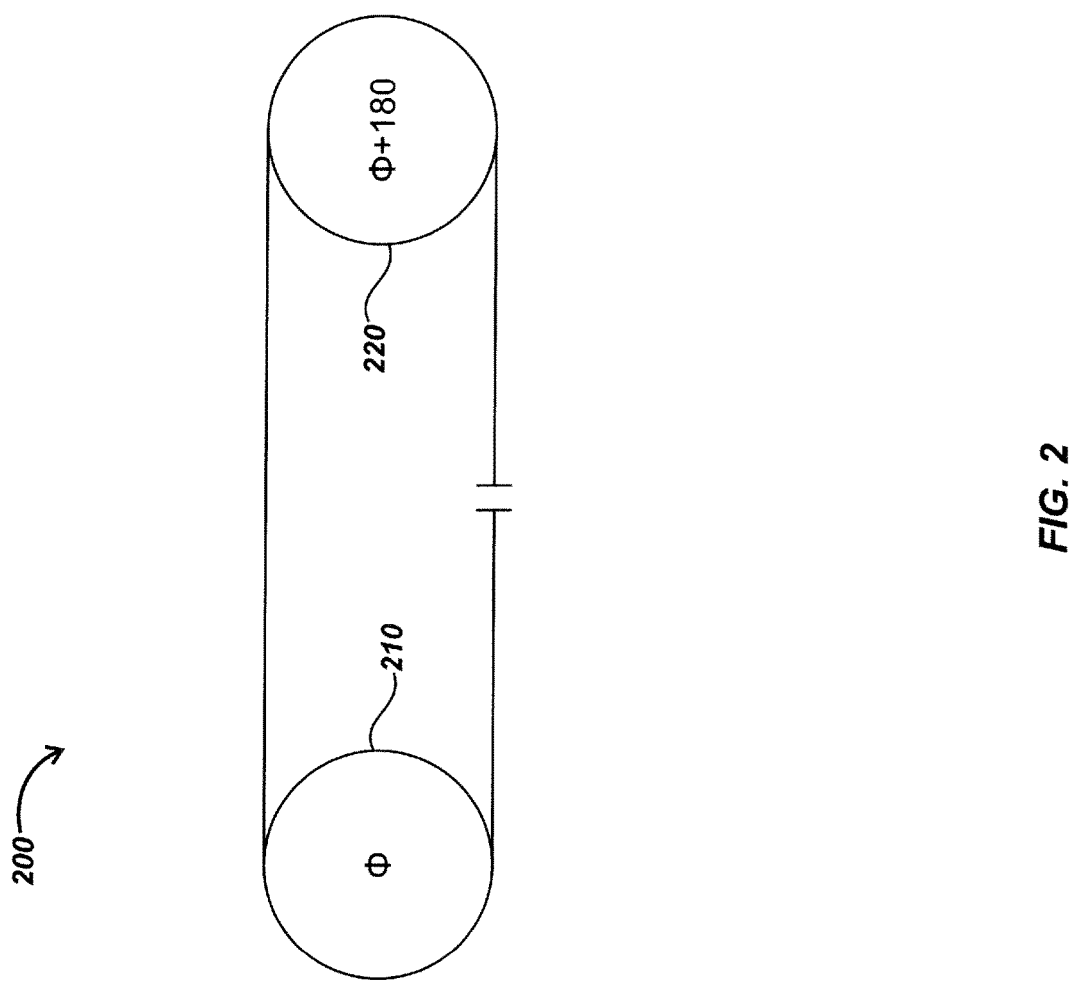
FIG. 2 is an illustration of resonant tank circuit embodiment for a nulled-signal locating device.

Turning to FIG. 2, details of one embodiment of transmitter coil configuration is shown. For example, the transmitting coils of both transmitter elements, such as those of the first transmitting element 110 and the second transmitting element 120 of FIGS. 1A and 1B, may be wired in series as part of a single circuit. This single circuit may be a resonant tank circuit such as the resonant tank circuit 200 illustrated in FIG. 2 (with corresponding resonant tuning elements omitted for clarity). In the resonant tank circuit 200 a first transmitting coil 210 and a second transmitting coil 220 may be commonly wired such that turns on the first transmitting coil 210 are wound in a direction opposite to the turns on the second transmitting coil 220. For instance, turns of wire on the first transmitter coil 210 may be wound in a clockwise direction whereas the turns on the second transmitter coil 220 may be wound in a counter-clockwise direction or vice versa. Similar configurations may be used in other transmitter antenna element configurations, such as multi-dimensional transmit antenna coil arrays.

In an exemplary embodiment, each transmitter coil may include the same number of turns, which may be identical in size. Litz wire may, for instance, be used to create a commonly wired circuit such as the resonant tank circuit 200 (e.g., to reduce skin effect, etc.). In other embodiments, separate circuits may be used. Separate circuits may, for example, be servo controlled to ensure that signals are identical and simultaneously transmitted with the appropriately opposing phases. Global navigation systems such as GPS or GLONASS or other technologies, by which accurate timing may be referenced and used control signal generation, may be used in synchronizing of transmitted signals. Various synchronization methods may be used in different embodiments, such as, for example, those described in co-assigned U.S. patent application Ser. No. 13/570,211, entitled PHASE SYNCHRONIZED BURIED OBJECT LOCATOR APPARATUS, SYSTEMS, AND METHODS, filed Jun. 9, 2013, the content of which is incorporated by reference herein in its entirety.

Figure 3A:
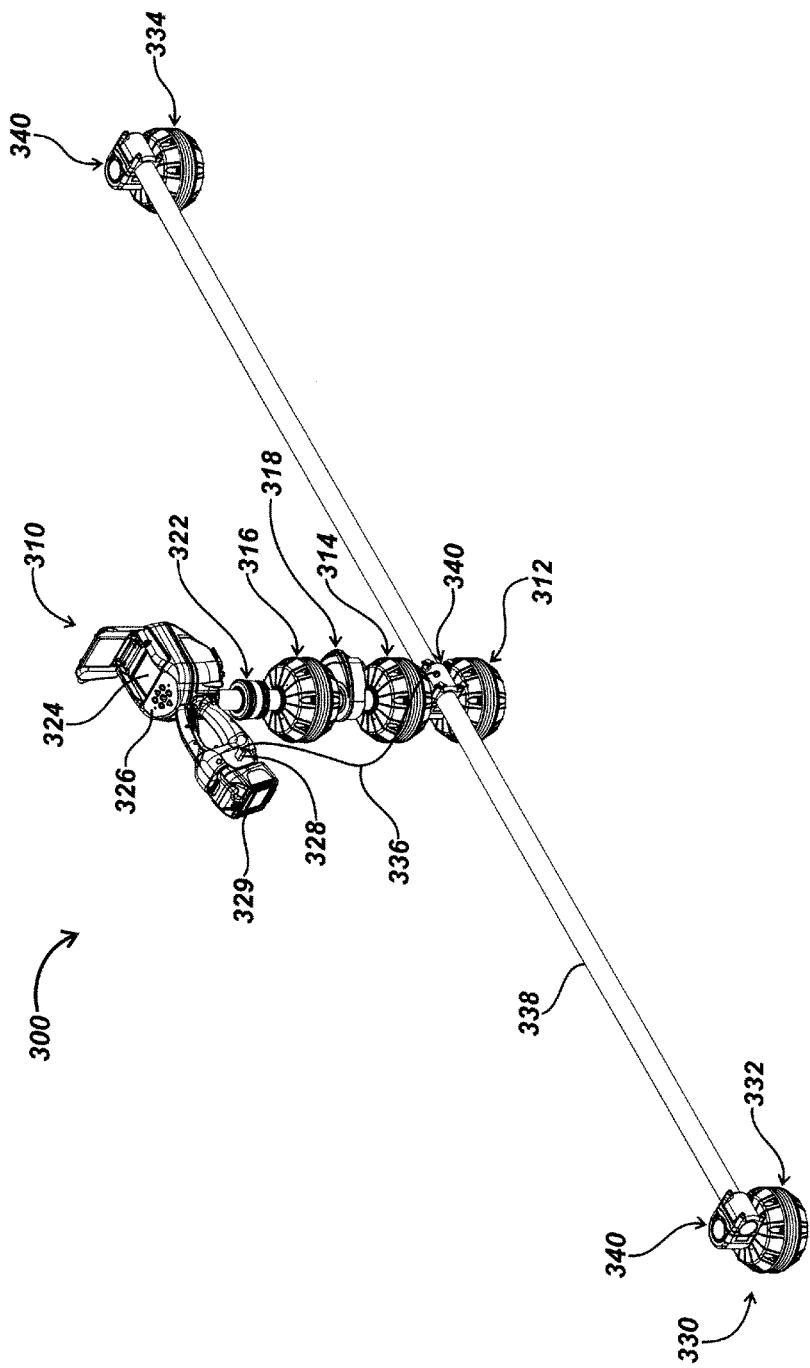
FIG. 3A is an isometric view of an embodiment of a nulled-signal locating device as an accessory attachment to a utility locator device.
Figure 3B:
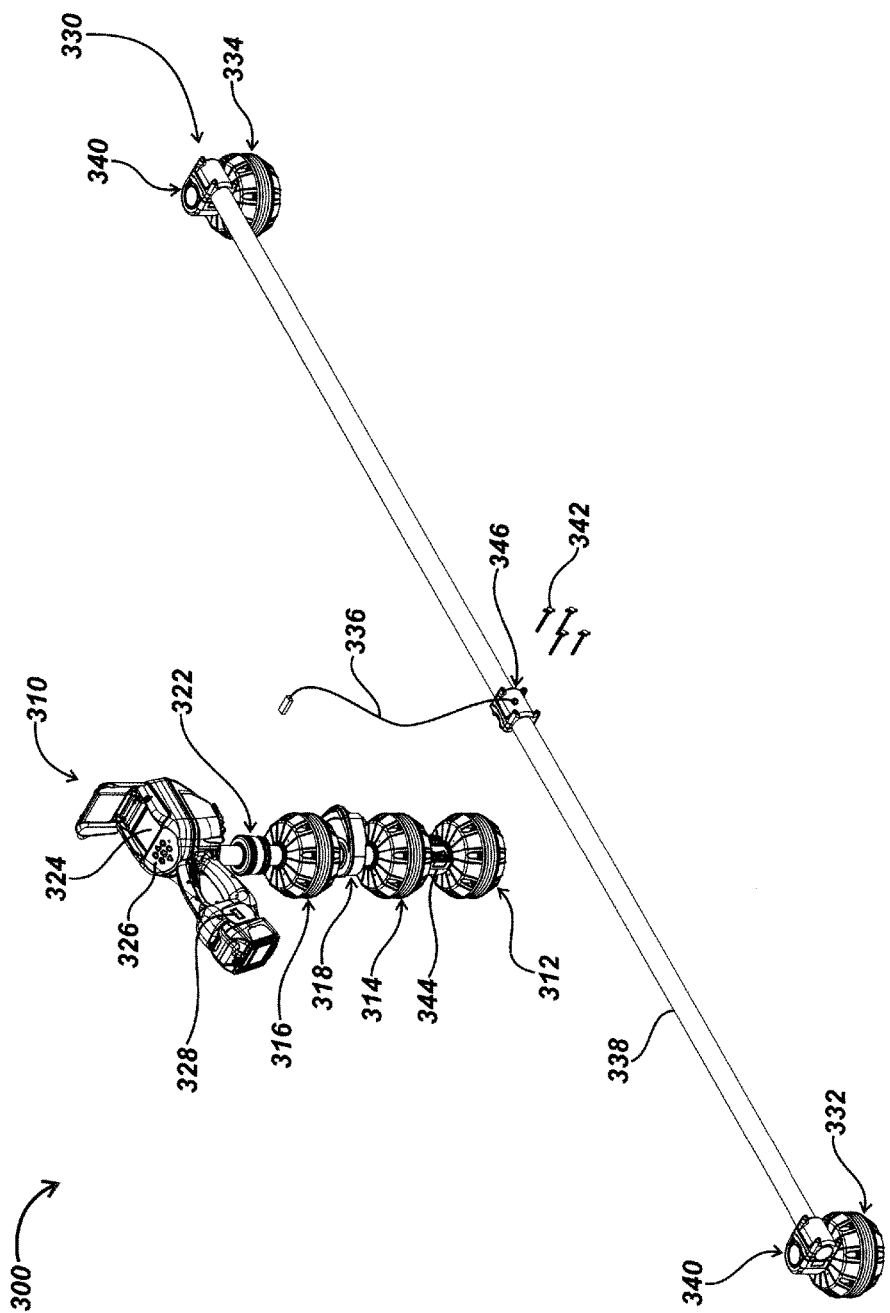
FIG. 3B is an isometric view of the nulled-signal locating device accessory attachment from FIG. 3A removed from the utility locator device.

Turning to FIGS. 3A and 3B, in an exemplary embodiment of a nulled-signal locating device, such as the nulled-signal locating device 300, the sensing element may be a utility locator device 310 configured to interface with a nulled-signal transmitter attachment device 330. Various details of utility locator devices as may be used in embodiments in conjunction with the disclosures herein are described in the patents and patent applications incorporated herein. The utility locator device 310 may include a primary sensing node 312 as well as a series of auxiliary sensing nodes, such as auxiliary sensing node 314 and/or auxiliary sensing node 316. In a utility locator device with multiple vertically spaced apart sensing nodes configured with at least one antenna, such as with the utility locator device embodiment 310, a measure of the depth of sensed utility lines may be determined. For example, in the nulled-signal locating device 300 the primary sensing node 312 may be positioned centrally at a sensing point or node, where the nulling of signals produced from a first transmitter node 332 and a second transmitter node 334 is done. The auxiliary sensing nodes 314 and 316 may be offset a predetermined distance from the primary sensing node 312. The transmitted signal(s) of the transmitting element 334 may have a known phase relationship to the sensing nodes 1312, 1314, and/or 1316. As discussed in subsequent sections herein, methods may be used to null sensed signals at offset positions, such as the auxiliary sensing nodes 314 and 316, within software and/or through electronic nulling methods.

Still referring to FIGS. 3A and 3B, a separate sensor array 318, which may include various sensors and related technologies including, but not limited to, optical sensors, acoustic sensors, GPS receivers and signal processors or other position-sensing devices or systems, precision-time sensors, mapping technologies and related sensors, and/or any of the various technologies and devices as described in aforementioned incorporated patents and patent applications.

The utility locator device 310 and/or the nulled-signal attachment accessory 330 may further be equipped with various internal sensors and technologies such as those described in the various aforementioned incorporated patents and patent applications. For instance, one or more GPS or other global navigation system sensors, communication modules (e.g., cellular data transmission modules, Wi-Fi transceiver modules, Bluetooth transceiver modules, etc.) for wirelessly communicating data to other system devices such as other utility locators, base stations, and/or laptop/tablet computing devices, and the like. One or more user safety mechanisms may be included in a nulled-signal locating device in keeping with the present disclosure, such as the safety flasher ring 322 on the utility locator device 310. Details of various aspects of safety flasher rings as may be used in conjunction with the disclosures herein are described in co-assigned U.S. patent application Ser. No. 13/851,951, entitled DUAL ANTENNA SYSTEMS WITH VARIABLE POLARIZATION, filed Mar. 27, 2013, the content of which is incorporated by reference herein in its entirety. In addition, GPS or other satellite or terrestrial-based positioning system receiver modules may include or be coupled to the various dual-antenna system embodiments disclosed in this patent application.

Still referring to FIGS. 3A and 3B, the utility locator device 310 may include various elements to communicate information to a user. For instance, a user interface display 324, such as an LCD or other visual display module, may be used to indicate measured position, orientation, depth, and/or other information associated with one or more buried utilities or other conductors. In various embodiments, a nulled-signal locating device may further include other elements to communicate such information to a user. For instance, a nulled-locating device may be configured to provide audible indicators, flashing of lights, haptic feedback, and/or other user interface elements or communication technologies and associated devices. For example, a communications module such as a Bluetooth or Wi-Fi module may be included to couple information to other devices or system in the proximity of the locator, and/or remotely located.

The locator device may be further configured to allow a user be control various aspects of the utility locator device 310, nulled-signal transmitter attachment device 330, and/or overall nulled-signal locating device 300 and associated devices or systems with user input controls such as the input controls 326, which may be switches, knobs, buttons, touch-screen displays, and the like.

Still referring to FIGS. 3A and 3B, the transmitter element embodiment of a nulled-signal locating device, such as the nulled-signal transmitter attachment device 330 of the nulled-signal locating device 300, may be configured as an attachment accessory for a utility locator device, such as the utility locator device 310. In such embodiments, the utility locator device 310 may include a connector port 328 by which a cable connector 336 on the nulled-signal transmitter attachment device 330 connects for transmitting power and/or communicating data between the utility locator device 310 and the nulled-signal transmitter attachment device 330.

Power may be transferred via wires or other conductors from a battery 329 on the utility locator device 310, which may also power the utility locator device 310. In an exemplary embodiment, the battery may be an intelligent battery and the locator may include an intelligent battery dock or other coupling mechanism. In some embodiments, external batteries, separate from a battery powering the utility locator device, may be used to power the transmitting elements of a nulled-signal locating device in keeping with aspects of the present disclosure and/or provide associated functions such as data and/or code transfer, battery monitoring, and the like. As noted, some embodiments may use intelligent batteries and associated docking and control elements such as, for example, are described in co-assigned U.S. patent application Ser. No. 13/532,721, entitled MODULAR BATTERY PACK APPARATUS, SYSTEMS, AND METHODS, filed Jun. 25, 2012, the content of which is incorporated by reference herein in its entirety.

Other communication modules may be incorporated in various nulling locator embodiments and may be used to communicate information between utility locator devices and transmitter element attachments such as, but not limited to, wireless local area network modules such as WIFI, industrial, scientific, and medical radio (ISM) modules, Bluetooth modules, cellular data communication modules, and the like.

In some embodiments the signals transmitted from the transmitter elements may further be phase and/or amplitude encoded to communicate data to sensing elements and/or other system devices. For example, the nulled-signal transmitter attachment device embodiment 330 of the nulled-signal locating device embodiment 300 may include a horizontal crossbar element 338 that the utility locator device 310, the first transmitter node 332, and/or the second transmitter node 334 may secure to via a series of mounting brackets 340 or other attachment mechanisms. As illustrated in FIG. 3B, when a series of screws 342 are removed, the mounting brackets 340 may separate into a vertical mast retaining subassembly 344 secured to the utility locator device 310 and a horizontal crossbar retaining subassembly 346 secured to the horizontal crossbar element 338.

In some alternative embodiments, other types of fasteners, snaps, brackets, and the like may be used to secure a nulled-signal transmitter attachment device to a utility locator device either permanently or removably. In some embodiments of a nulled-signal locating device in accordance with aspects of the present disclosure, the nulled-signal locating device may be a stand-alone device or may be built into or onto a utility locator device rather than in the form of a detachable accessory.

Figure 3C:
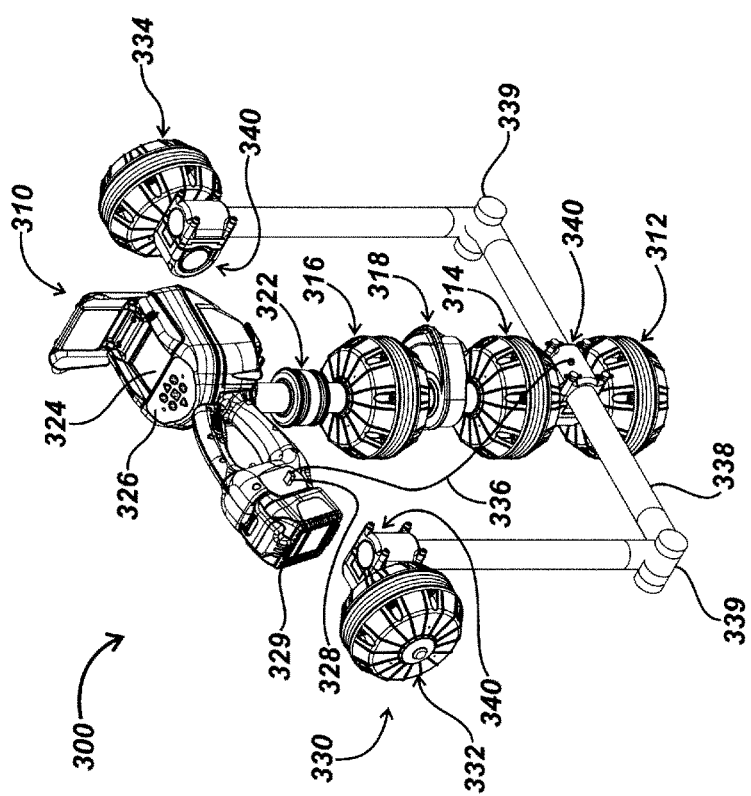
FIG. 3C is an isometric view of the nulled-signal locating device from FIG. 3A with a flexible horizontal crossbar element.

Turning to FIG. 3C, in some embodiments the horizontal crossbar element 338 may include one or more flexible/adjustable joints or rigid joints, such as the joints 339. The joints 339 may allow for more convenient stowage of the horizontal crossbar element 338 and attached transmitter nodes 332 and 334 by facilitating folding for storage or transportation. For example, the joints may include a screw-know or other tightening mechanism in conjunction with rotating elements to allow a user to adjust the positioning of the transmitter nodes relative to the rest of the device and/or to compactly stow the transmitter nodes or remove them from the device.

Figure 3D:
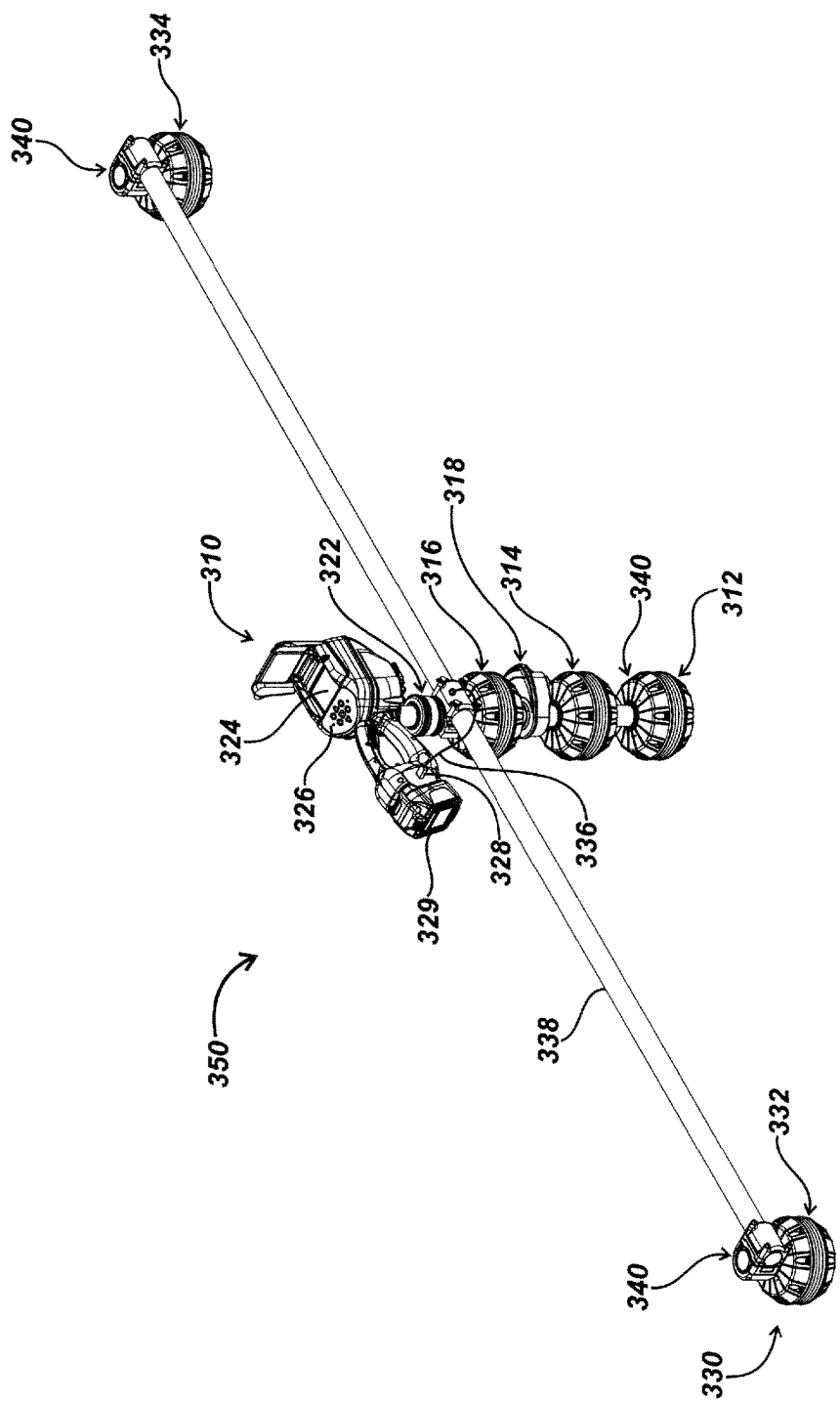
FIG. 3D is an isometric view of an embodiment of a nulled-signal locating device.

Turning to FIG. 3D, some nulled-signal locating device embodiments, such as the nulled-signal locating device embodiment 350, may be configured with a horizontal crossbar element 338 and attached transmitter nodes 332 and 334 positioned about a sensing node other than the bottom primary sensing node 312. The horizontal crossbar element 338 and attached transmitter nodes 332 and 334 of the nulled-signal locating device 350 may center about the top sensing node 316. Various embodiments may further be configured to operate with other sensing nodes in various configurations.

In further embodiments not illustrated, transmitter nodes may be offset in different directions and/or distances from sensing element(s). In such embodiments, nulling methods implemented in software (as described subsequently herein in connection with FIG. 14) and/or electronic nulling methods may be used fully or partially to null sensed signals. In yet further embodiments, transmitting and/or sensing elements may be configured to be physically moved or adjusted to null signals. For instance, transmitting and receiving elements may be in a fixed relationship to each other and may be moved separately or together by a user to adjust and/or calibrate the nulling. Other embodiments (not shown) may use additional transmitter elements to provide three-dimensional transmit signals. For example, a configuration such as that shown in FIG. 3D may include additional transmit elements along an axis orthogonal to the horizontal crossbar element and vertical locator element.

Figure 4A:
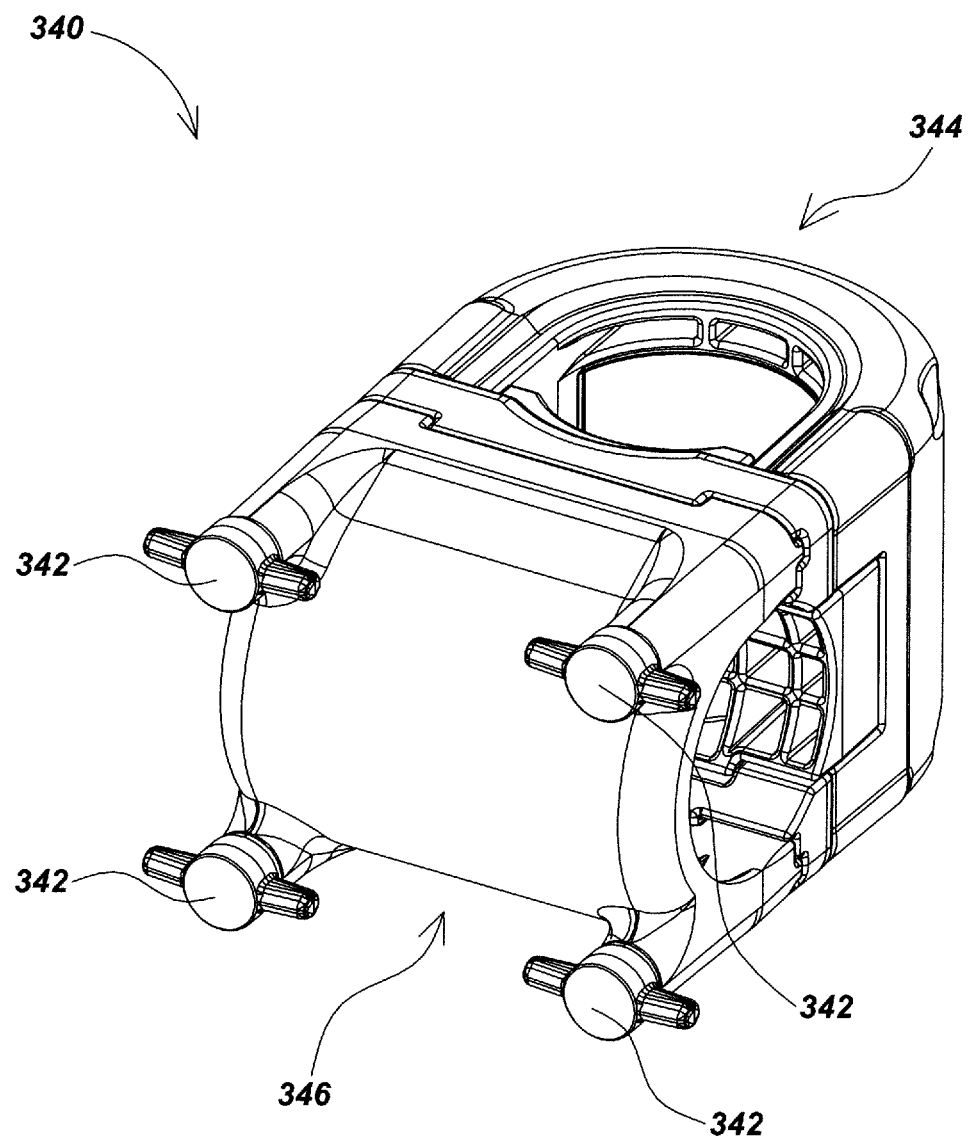
FIG. 4A is an isometric view of a mounting bracket embodiment.
Figure 4B:
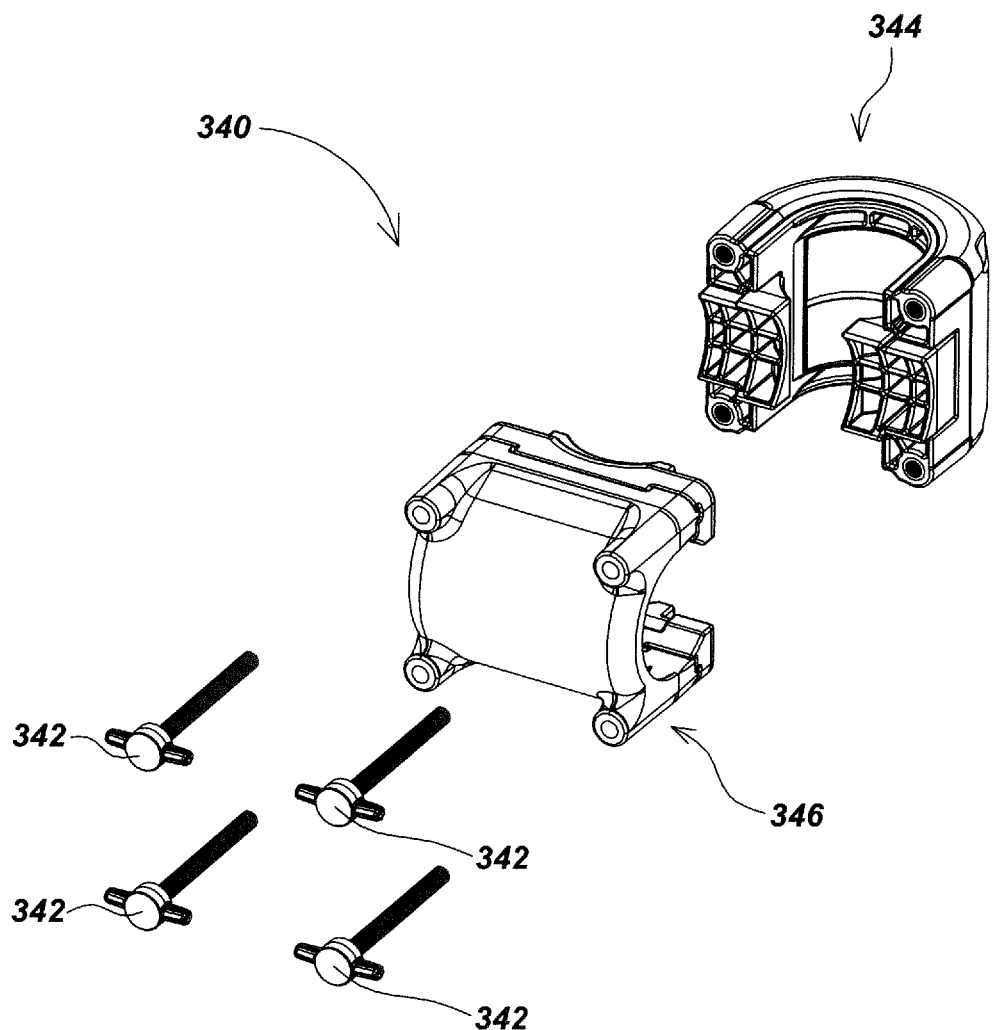
FIG. 4B is the mounting bracket embodiment of FIG. 4A exploded into subassemblies.

Turning to FIGS. 4A and 4B, embodiments of the mounting bracket 340 are illustrated in greater detail. As best illustrated in FIG. 4B, when the screws 342 are removed from the central mounting bracket 340 securing the nulled-signal transmitter attachment device 330 (FIGS. 3A-3B) to the utility locator 310 (FIGS. 3A-3B) and the cable connector 336 (FIGS. 3A-3B) has been dislodged from the connector port 328 (FIGS. 3A-3B) on the utility locator 310 (FIGS. 3A-3B), the mounting brackets 340 may separate into its vertical mast retaining subassembly 344 and horizontal crossbar retaining subassembly 346, thereby allowing the nulled-signal transmitter attachment device 330 (FIGS. 3A-3B) to be removed from the utility locator 310 (FIGS. 3A-3B).

When the screws 342 are removed from the central mounting bracket 340 securing the first transmitter node 332 (FIGS. 3A-3B) and the second transmitter node 334 (FIGS. 3A-3B) to the horizontal crossbar element 338 (FIGS. 3A-3B) and any internal wiring running to either the first transmitter node 332 (FIGS. 3A-3B), and the second transmitter node 334 (FIGS. 3A-3B) has been disconnected, the mounting brackets 340 may separate into its vertical mast retaining subassembly 344 and horizontal crossbar retaining subassembly 346. This may be done to allow the first transmitter node 332 (FIGS. 3A-3B) and/or the second transmitter node 334 (FIGS. 3A-3B) to be removed from the horizontal crossbar element 338 (as shown in FIGS. 3A-3B).

Figure 5:
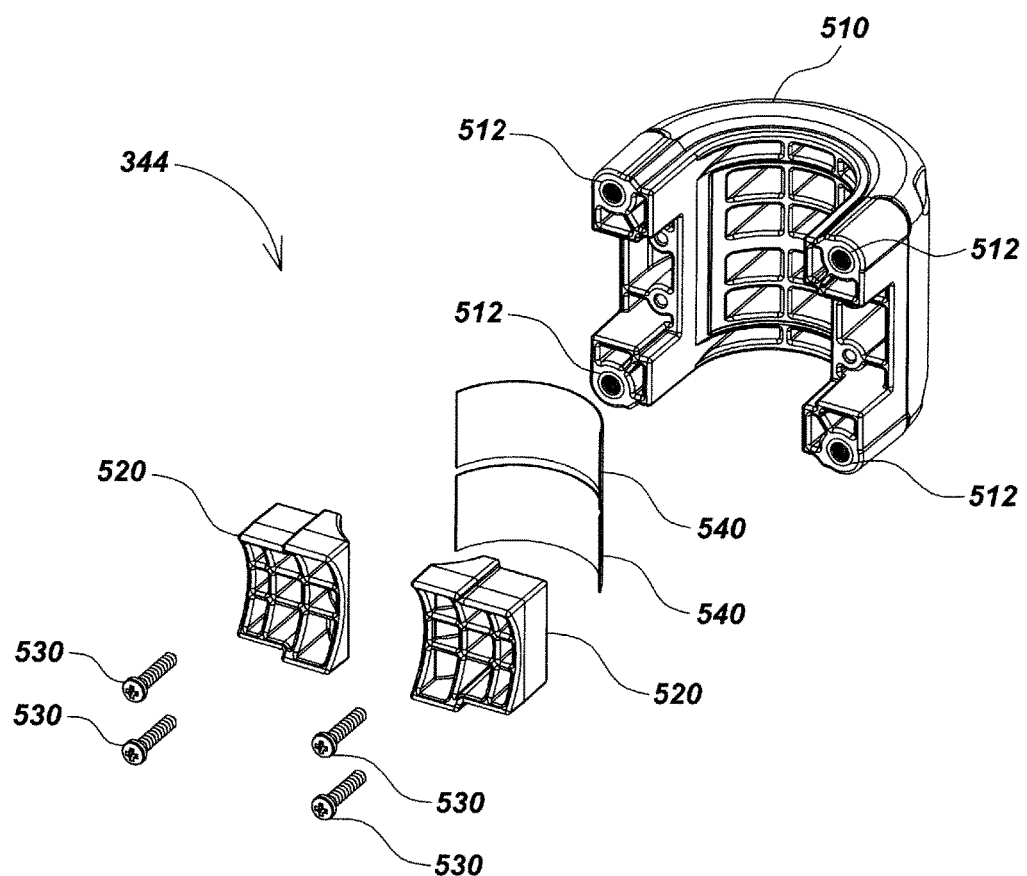
FIG. 5 is an explode view of a vertical mast retaining subassembly embodiment.
Figure 7A:
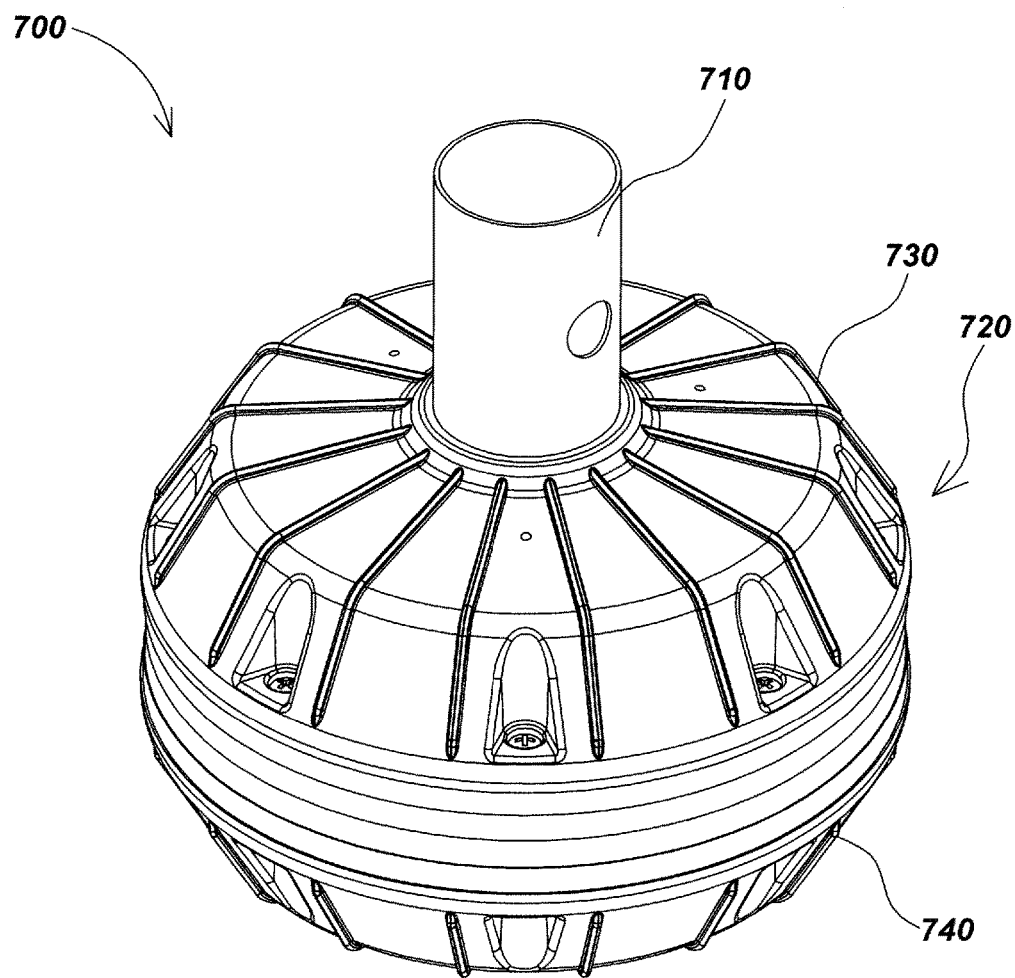
FIG. 7A is an isometric view of a transmitter node embodiment.
Figure 7B:
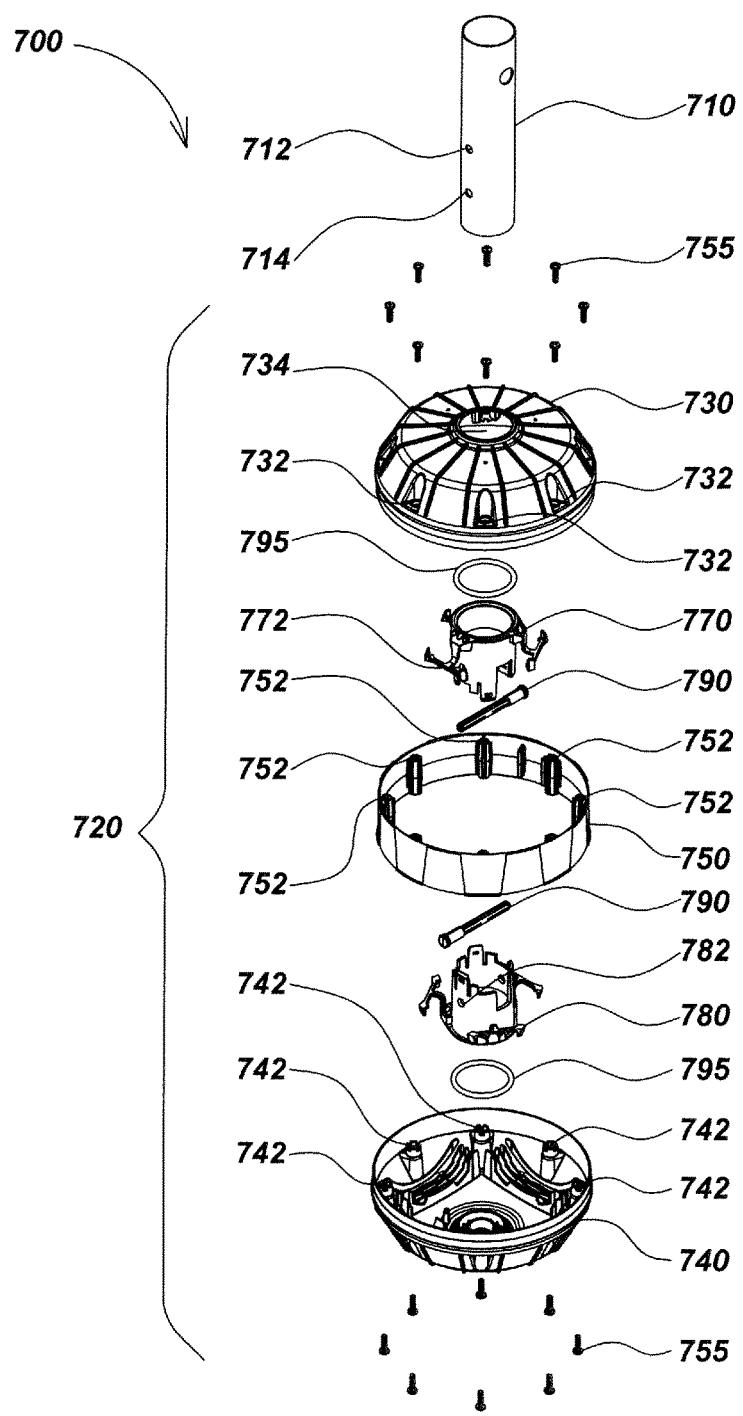
FIG. 7B is a top down exploded view of the transmitter node embodiment of FIG. 7A.
Figure 7C:
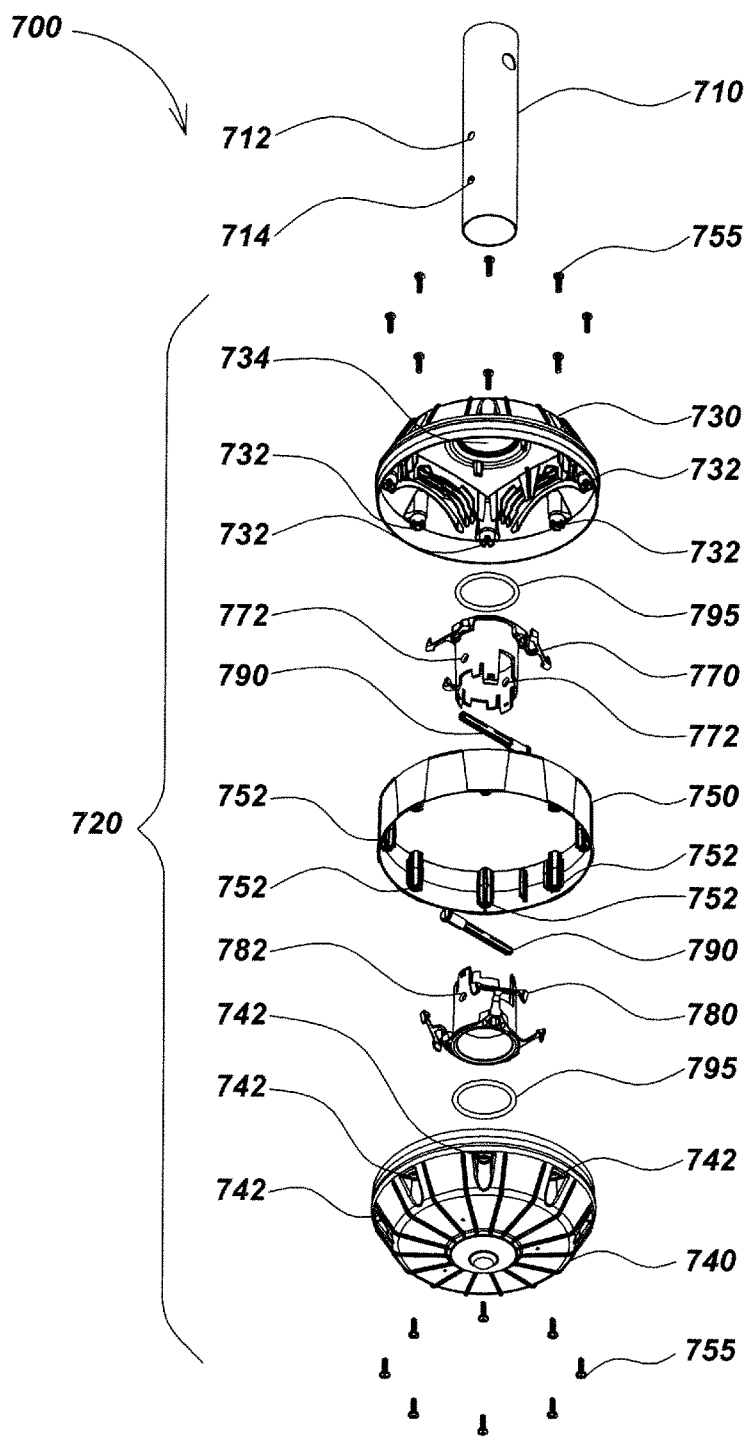
FIG. 7C is a bottom up exploded view of the transmitter node embodiment of FIG. 7A.

Turning to FIG. 5, the vertical mast retaining subassembly 344 may further include an outer mast retainer element 510, which may be largely crescent shaped, and a pair of inner mast retainer elements 520. These may secure to the outer mast retainer element 510 via screws 530. In assembly, the outer mast retainer element 510 may fit about a cylindrical portion of a vertically oriented shaft, such as the mast of a utility locator device 310 (FIGS. 3A and 3B) and/or a transmitter node mast element 710 (as shown in FIGS. 7A-7C). They may be held thereto by the inner mast retainer element 520, disallowing the shaft portion to fit back through the opening of the crescent shaped outer mast retainer element 510. One or more portions of double-sided tape 540 may optionally be positioned within the outer mast retainer element 510 and aid in securing the vertical mast retaining subassembly 344 against unwanted rotations.

The outer mast retainer element 510 may further be formed with a series of threaded hole features 512 such that when the vertical mast retaining subassembly 344 is made to secure together with the horizontal crossbar retaining subassembly 346 (FIGS. 4A and 4B). Threaded holes on the horizontal crossbar retaining subassembly 346 (FIGS. 4A and 4B) may align with the threaded hole features 512 on the outer mast retainer element 510 and allow the horizontal crossbar retaining subassembly 346 (FIGS. 4A and 4B) to secure to the vertical mast retaining subassembly 344 via screws 342 (FIGS. 4A and 4B).

The inner mast retainer elements 520 may be formed with curved inner and outer faces such that when the horizontal crossbar retaining subassembly 346 (FIGS. 4A and 4B) is secured to the vertical mast retaining subassembly 344 the curved faces of the inner mast retainer elements may fit snuggly following the curve of the vertically oriented shaft of the mast of the utility locator device 310 (FIGS. 3A and 3B) or the transmitter node mast element 710 (FIGS. 7A-7C) on one side, and to the cylindrical shape of the horizontal crossbar element 338 (FIGS. 3A-3B) on the other.

Figure 6:
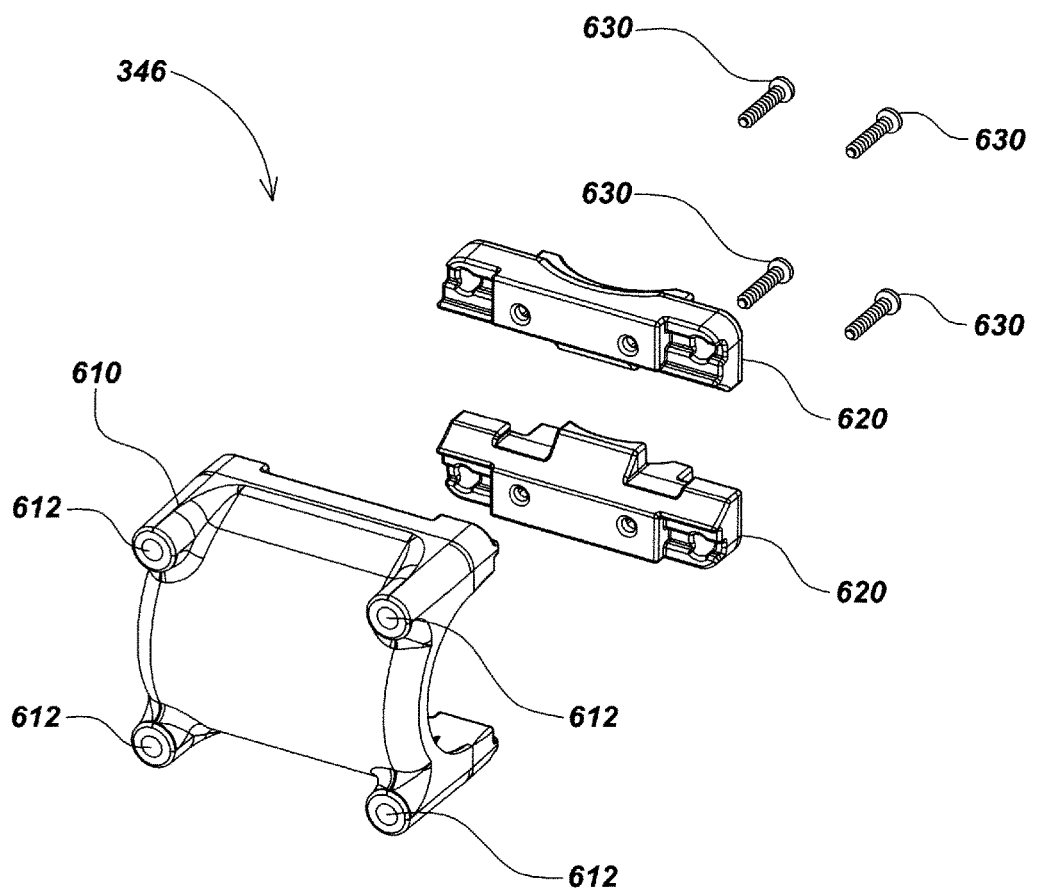
FIG. 6 is an exploded view of a horizontal crossbar retaining subassembly embodiment.

Turning to FIG. 6, the horizontal crossbar retaining subassembly 346 may further include an outer crossbar retainer element 610, which may be in a largely crescent shape as shown, and a pair of inner crossbar retainer elements 620 that secure to the outer crossbar retainer element 610 via screws 630 or other attachment mechanisms. Other shapes and/or sized may be used to secure to other attachment mechanisms. In assembly the outer crossbar retainer element 610 may fit about a cylindrical portion of the horizontal crossbar element 338 (as shown in FIGS. 3A-3B) and be held thereto by securing the inner crossbar retainer elements 620 to the outer crossbar retainer elements 610 and thus disallowing the horizontal crossbar element 338 (as shown in FIGS. 3A-3B) to fit back through the opening of the crescent shaped outer crossbar retainer element 610.

The outer crossbar retainer element 610 may further be formed with a series of threaded hole features 612 such that when the horizontal crossbar retaining subassembly 346 is made to secure together with the vertical mast retaining subassembly 344 (FIGS. 4A and 4B), the threaded hole features 512 (FIG. 5) on the outer mast retainer element 510 (FIG. 5) may align with the threaded hole features 612 on the outer crossbar retainer element 610 and allow the horizontal crossbar retaining subassembly 346 to secure to the vertical mast retaining subassembly 344 (FIGS. 4A and 4B) via screws 342 (FIGS. 4A and 4B) and/or other attachment mechanisms.

The inner crossbar retainer element 620 may be formed with curved inner and outer faces or other shapes such that when the horizontal crossbar retaining subassembly 346 is secured to the vertical mast retaining subassembly 344 (FIGS. 4A and 4B), the curved faces of the inner crossbar retainer element 620 fit snugly following the curve of the horizontal crossbar element 338 on one side and the curves of the vertically oriented shaft of the mast of the utility locator device 310 (FIGS. 3A and 3B) or the transmitter node mast element 710 (FIGS. 7A-7C) on the other.

Turning to FIGS. 7A-7C, a transmitter node embodiment 700, which may correspond with the first transmitter node 332 (FIGS. 3A and 3B) and/or the second transmitter node 334 (as shown in FIGS. 3A and 3B), may include a transmitter node mast element 710 and a transmitter housing subassembly 720. The transmitter housing subassembly 720 may include a top shell half 730 and a bottom shell half 740.

Turning to FIGS. 7B and 7C, the top shell half 730 may be formed with a series of top antenna bobbin retainer features 732 and the bottom shell half 740 may be formed with a series of aligned bottom antenna bobbin retainer features 742. Internally, an antenna coil and bobbin 750 containing a series of bobbin mounting post features 752 may be configured to seat centrally within the top shell half 730 and bottom shell half 740 such that the bobbin mounting post features 752 align and seat within the top antenna bobbin retainer features 732 on the top shell half 730, and the bottom antenna bobbin retainer features 742 on the bottom shell half 740. Each of the bobbin mounting post features 752, the top antenna bobbin retainer features 732, and the bottom antenna bobbin retainer features 742 may be formed with a commonly aligned and dimensioned threaded hole such that a series of screws 755 may, from the outside of the top shell half 730 and the bottom shell half 740, secure the top shell half 740 to the antenna coil and bobbin 750 and the bottom shell half 740 to the antenna coil and bobbin 750. The antenna coil and bobbin 750 may include a largely circular bobbin support structure onto which a number of turns of wire, which may be Litz wire, may be wound in order to create a transmitting coil. Other coil configurations and arrays may also be used in alternate embodiments.

In some embodiments of a nulled-signal locating device in accordance with aspects of the present disclosure, one coil of an opposing pair of transmitting coils may contain turns of wire wound in the opposite direction from the other coil. For example, the wiring of one transmitting coil may be wound in a clockwise direction while the wiring of its opposing transmitting coil may be wound in a counterclockwise direction. The pair of opposing transmitter coils may, in some embodiments, be commonly wired into a single resonant tank circuit such as the resonant tank circuit 200 of FIG. 2. In other embodiments, separate circuits may be used.

Separate circuits may, for instance, be servo controlled or otherwise controlled using electronic control techniques known or developed in the art for ensuring that signals are substantially identical and simultaneously broadcast with the appropriately opposing phases. For example, feedback control, from sensing elements or sensors to the transmitter elements, may be used to provide control signaling. Alternately, or in addition, global navigation systems such as GPS or GLONASS, or other timing-related technologies by which accurate timing may be determined, may be used in synchronizing of transmitted signals. In various embodiments, synchronization methods may be used such as, for example, those described in co-assigned U.S. patent application Ser. No. 13/570,211, entitled PHASE SYNCHRONIZED BURIED OBJECT LOCATOR APPARATUS, SYSTEMS, AND METHODS, filed Jun. 9, 2013, the content of which is incorporated by reference herein in its entirety.

In some embodiments, more than a single opposing pair of transmitting coils may be used. For example, arrays of transmitting coils, which may be separately spaced and/or nested, may be used. In such embodiments, the different coils may be operated at different frequencies and/or at multiple frequencies either sequentially or simultaneously.

In embodiments operating with multiple frequencies, a time multiplexing scheme may be used by which frequencies are broadcasted for pre-determined time periods before being shut off and/or switched to a different frequency. Further aspects of some such time multiplexing or frequency switching schemes as may be combined with the disclosures herein various embodiments are described in, for example, co-assigned U.S. patent application Ser. No. 13/676,989, entitled QUAD-GRADIENT COILS FOR USE IN LOCATING SYSTEMS, filed Nov. 14, 2012; U.S. patent Ser. No. 13/850,181, entitled QUAD-GRADIENT COILS FOR USE IN LOCATING SYSTEMS, filed Mar. 25, 2013; and U.S. patent Ser. No. 13/894,038, entitled OMNI-INDUCER TRANSMITTING DEVICES AND METHODS, filed May 14, 2013. The content of each of these applications is incorporated by reference herein in its entirety.

Referring still to FIGS. 7B and 7C, the top shell half 730 may further be formed with a central hole feature 734 dimensioned to allow the passage of the transmitter node mast element 710. A top mast retainer element 770 and a bottom mast retainer element 780 may seat onto the transmitter node mast element 710 within the transmitter housing subassembly 720. In assembly, a top retainer hole 772 formed on the top mast retainer element 770 may be configured to align with a top mast hole 712 formed on the transmitter node mast element 710. A pin 790 may be used to secure the top mast retainer element 770 to the transmitter node mast element 710.

A bottom retainer hole 782 formed on the bottom mast retainer element 780 may be configured to align with a bottom mast hole 714 formed on the transmitter node mast element 710. Another pin 790 may be used to secure the bottom mast retainer element 780 to the transmitter node mast element 710. In assembly, an O-ring 795 may be seated about transmitter node mast element 710 and above the top mast retainer element 770 between the top mast retainer element 770 and the top shell half 730. Another O-ring 795 may also be seated below the bottom mast retainer element 780 between the bottom mast retainer element 780 and the bottom shell half 740.

Figure 8A:
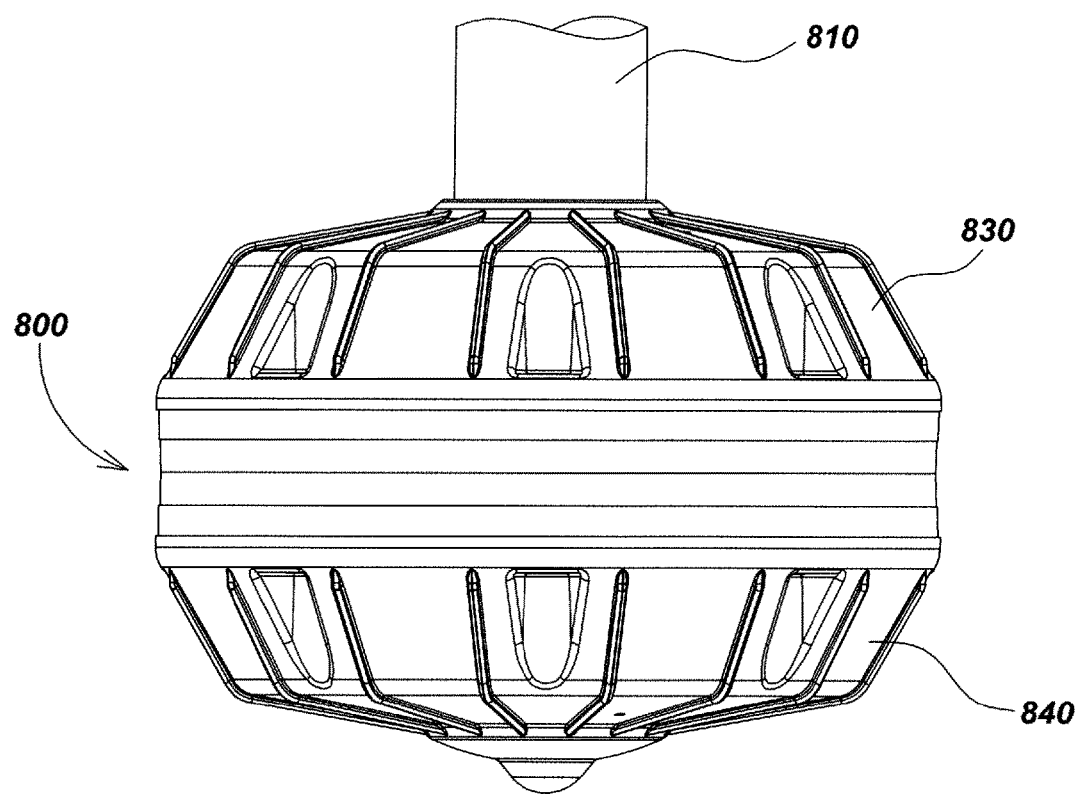
FIG. 8A is an isometric view of a sensing node embodiment.
Figure 8B:
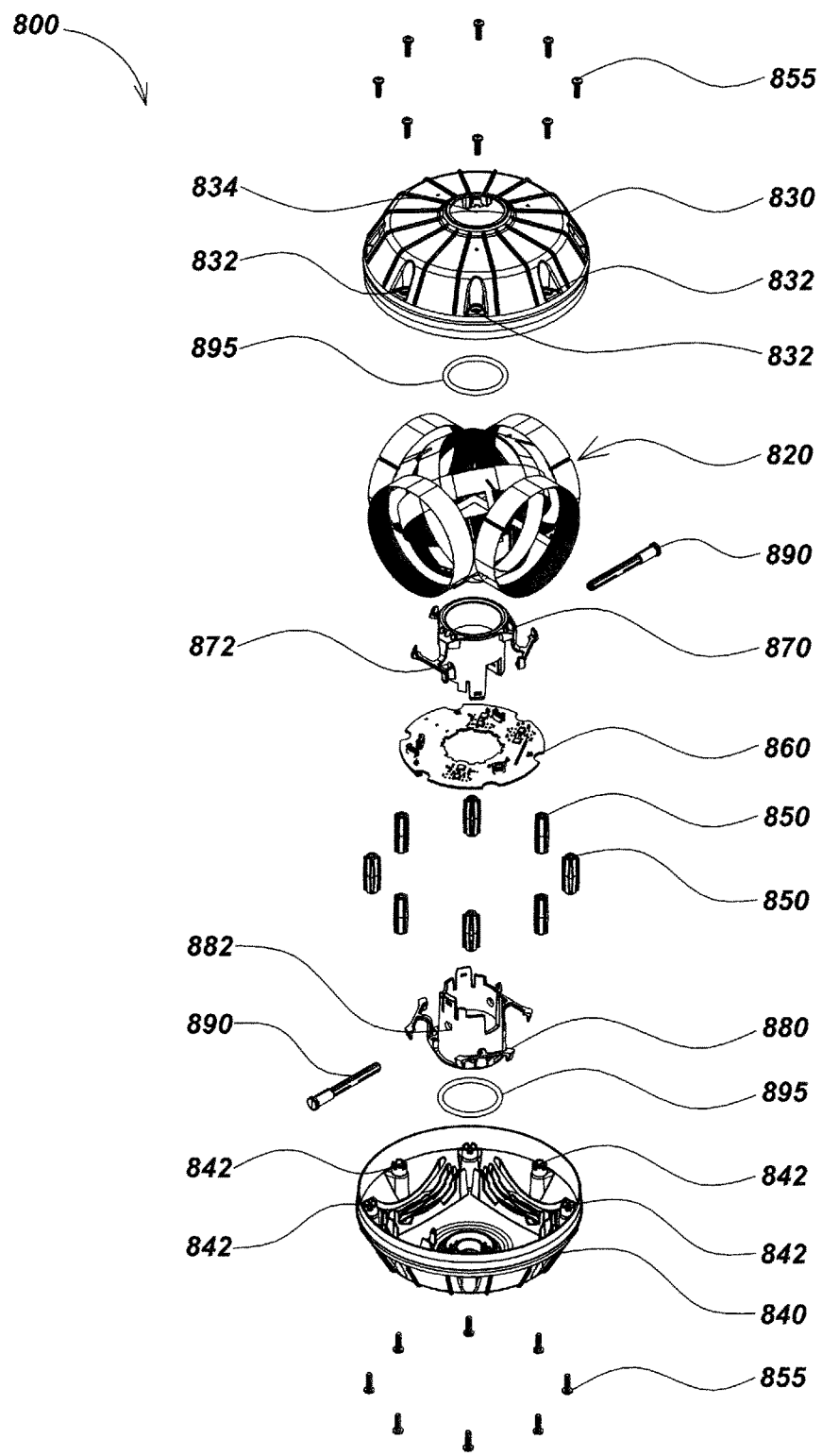
FIG. 8B is a top down exploded view of the sensing node embodiment of FIG. 8A.
Figure 8C:
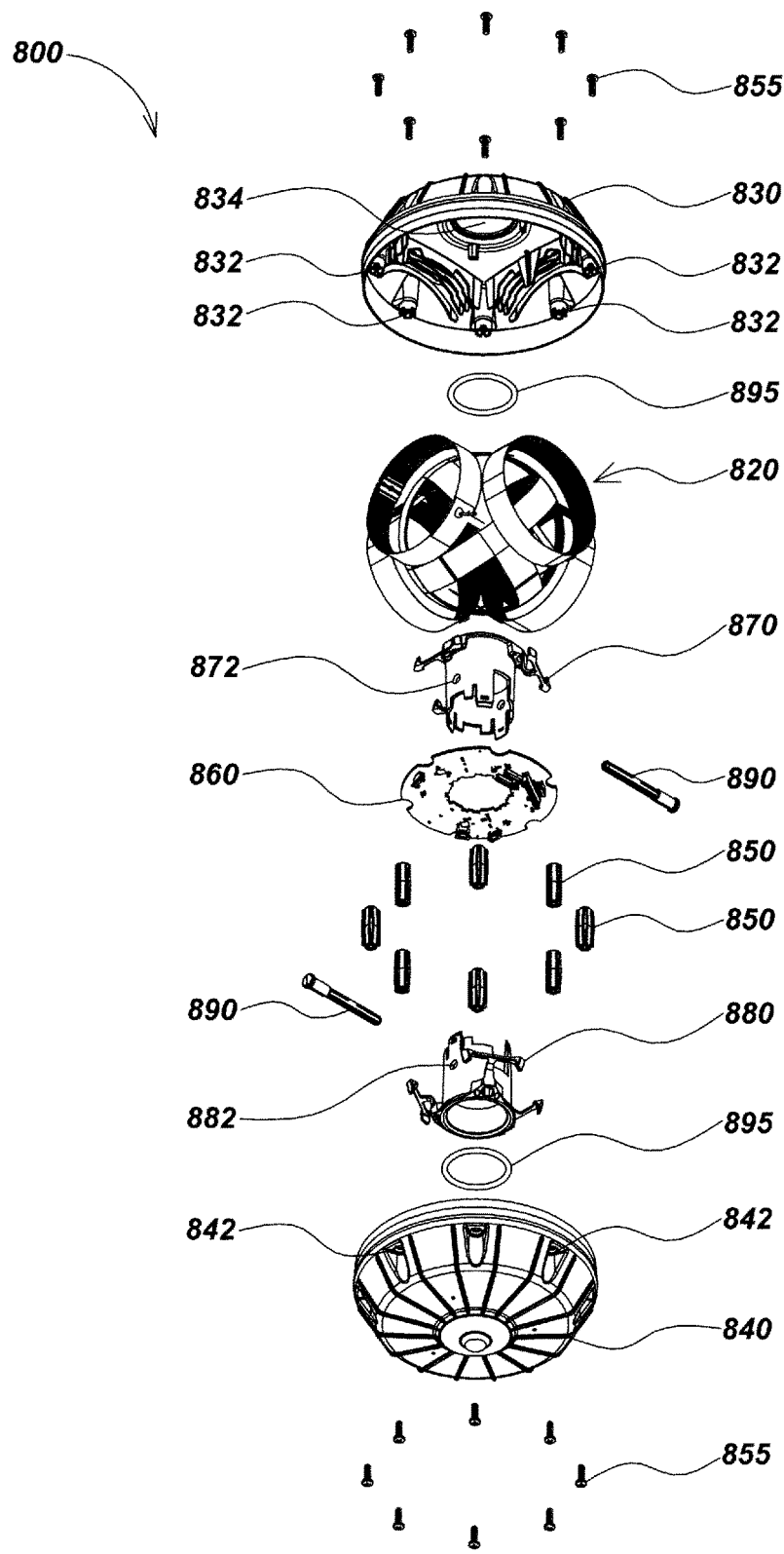
FIG. 8C is a bottom up exploded view of the sensing node embodiment of FIG. 8A.

Turning to FIGS. 8A-8C, a sensing node embodiment 800, which may correspond with the primary sensing node 312, auxiliary sensing node 314, and/or auxiliary sensing node 316 of FIGS. 3A and 3B or other sensing nodes described herein, is illustrated. The sensing node 800 may be secured to a locator mast, such as the locator mast 810 illustrated in part in FIGS. 8A-8C. The sensing node 800 may internally house one or more arrays of antenna coils, such as a quad-gradient and/or omnidirectional antenna array 820 illustrated in FIGS. 8B and 8C. Additional examples of details of embodiments of such antenna coils are described in the incorporated applications. The housing of sensing node 800 may include a top shell half 830 and a bottom shell half 840.

Turning to FIGS. 8B and 8C, the top shell half 830 may be formed with a series of top mounting features 832 and the bottom shell half 840 may be formed with a series of commonly aligned bottom mounting features 842. Internally, a series of mounting post elements 850 may be configured to seat and key within the top mounting features 832 and the bottom mounting features 842. Each of the mounting post elements 850, the top mounting features 832, and the bottom mounting features 842 may be formed with a commonly aligned and dimensioned threaded hole such that a series of screws 855 may, from the outside of the top shell half 830 and the bottom shell half 840 respectively, secure the top shell half 830 and the bottom shell half 840 together via the mounting post elements 850.

Referring still to FIGS. 8B and 8C, the top shell half 830 may further be formed with a central hole feature 834 dimensioned to allow the passage of the locator mast 810. A largely toroidal shaped PCB 860 may fit centrally onto the 810 within the sensing node 800. The PCB 860 may support signal-processing circuitry for the sensing node 800. In sensing nodes secured in the mid-section of a locator mast, such as the auxiliary sensing nodes 314 and 316 of FIGS. 3A and 3B, the bottom shell half 830 may also be formed with a central hole by which the locator mast may pass through (not illustrated).

Referring still to FIGS. 8B and 8C, a top mast retainer element 870 and a bottom mast retainer element 880 may seat onto the locator mast 810 such that the PCB 860 may be sandwiched between the top mast retainer element 870 and bottom mast retainer element 880.

In assembly, a top retainer hole 872 formed on the top mast retainer element 870 may be made to align with holes formed along the side the locator mast 810. A pin 890 may be used to secure the top mast retainer element 870 to the locator mast 810. A bottom retainer hole 882 formed on the bottom mast retainer element 880 that may be made to align with a second hole 814 formed lower along the side on the locator mast 810. Another pin 890 may be used to secure the bottom mast retainer element 880 to the locator mast 810. In assembly, an O-ring 895 may be seated about locator mast 710 and above the top mast retainer element 870 between the top mast retainer element 870 and the top shell half 830. Another O-ring 895 may also be seated below the bottom mast retainer element 880 between the bottom mast retainer element 880 and the bottom shell half 840.

Arms formed on the top mast retainer element 870 and a bottom mast retainer element 880 may further support a quad-gradient and/or omnidirectional antenna array 820. In alternative embodiments, sensing nodes may include one or more sensing coils or arrays arranged in various different geometries, shapes, element numbers, and/or sizes. Some example aspects of different antenna configurations as may be used in combination with the disclosures herein are described in co-assigned U.S. Pat. No. 7,009,399, entitled OMNIDIRECTIONAL SONDE AND LINE LOCATOR, issued Mar. 7, 2006; U.S. Pat. No. 7,443,154, entitled MULTI-SENSOR MAPPING OMNIDIRECTIONAL SONDE AND LINE LOCATOR, issued Oct. 28, 2008; U.S. Pat. No. 7,619,516, entitled SINGLE AND MULTI-TRACE OMNIDIRECTIONAL SONDE AND LINE LOCATORS AND TRANSMITTERS USED THEREWITH, issued Nov. 17, 2009; U.S. Pat. No. 7,009,399, entitled OMNIDIRECTIONAL SONDE AND LINE LOCATOR, issued Mar. 7, 2006; U.S. patent application Ser. No. 13/676,989, entitled QUAD-GRADIENT COILS FOR USE IN A LOCATING SYSTEM, filed Nov. 11, 2012; and U.S. patent application Ser. No. 13/469,024, entitled BURIED OBJECT LOCATOR APPARATUS AND SYSTEMS, filed on May 10, 2012. The content of each of these applications is incorporated by reference herein in its entirety.

Figure 9:
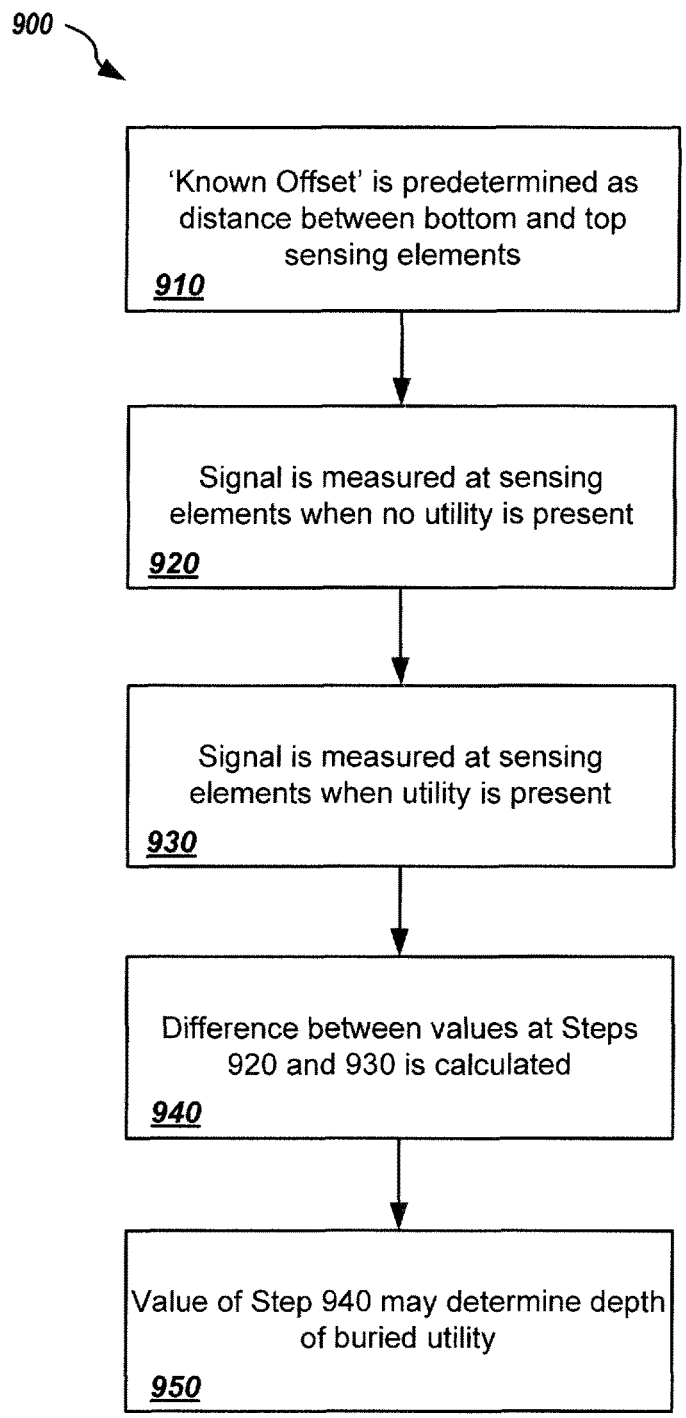
FIG. 9 is block diagram describing depth detection with a nulled-signal locating device embodiment.

Turning to FIG. 9, in some embodiments and implementations, depth of detected utility may be estimated using various methods implemented in whole or in part in software modules. The software modules may be implemented in one or more processing elements. For example, method embodiment 900 illustrates details of an embodiment of a method for determining an estimate of the buried utility depth. At stage 910, a known offset is predetermined. The offset may be based on the distance between the bottom and top sensors. At stage 920, signal(s) may be measured at the sensing elements at a location or calibration setup when no utility is present. At stage 930, signal(s) are measured at the sensing elements when a utility is known or suspected to be present. At stage 940, the difference between values at steps 920 and 930 is calculated. At stage 950, the calculated value from step 930 may be used to determine an estimate of the depth of the buried utility.

Figure 10A:
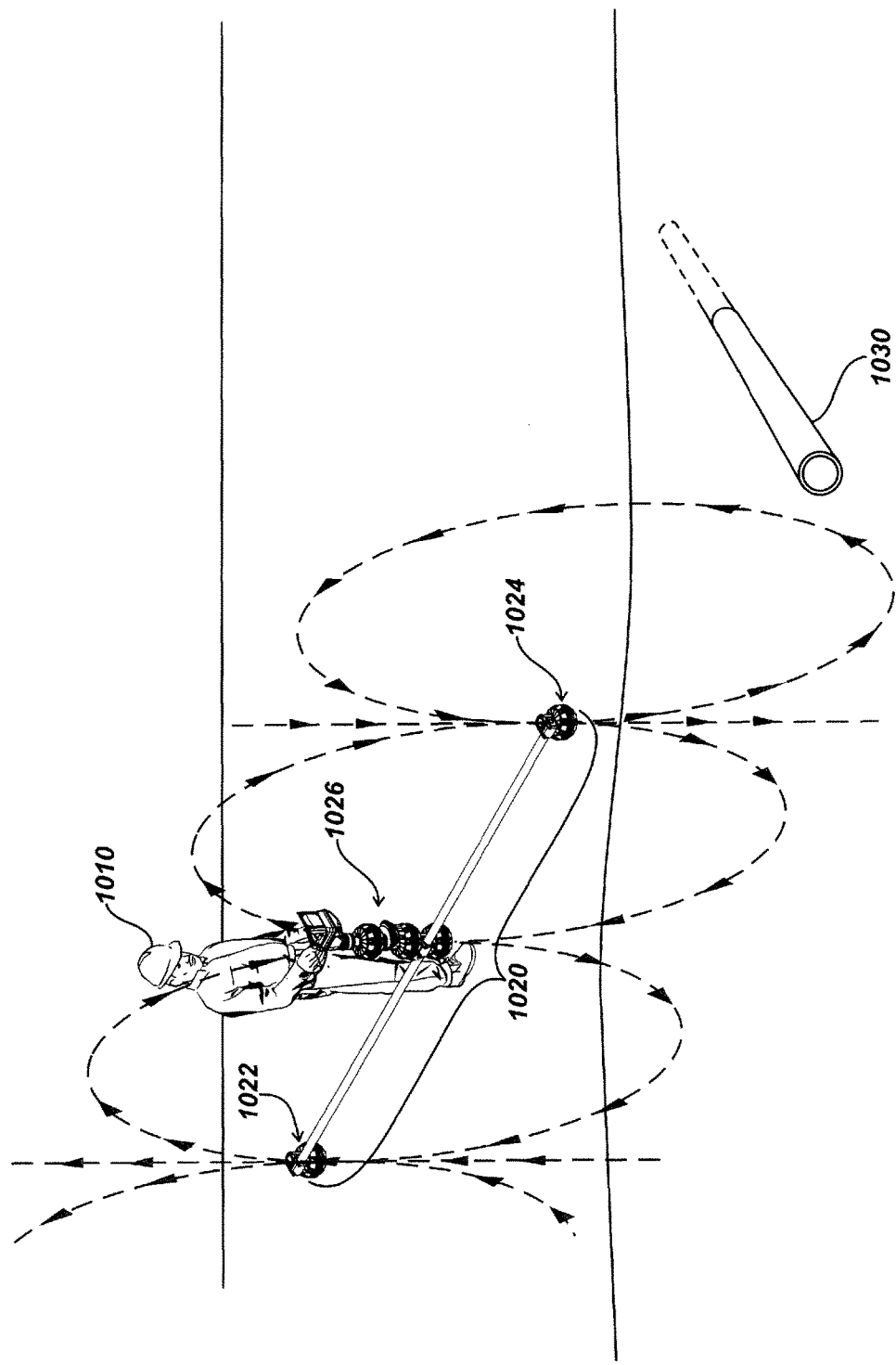
FIG. 10A is an illustration of a nulled-signal locating device embodiment in use.

Turning to FIGS. 10A and 10B, examples of details of a locate operation using a nulling locator embodiment are shown. In FIG. 10A, a user 1010 equipped with a nulled-signal locating device embodiment, such as nulling locator embodiment 1020, may traverse a locate area in search of a buried utility line such as the buried utility line 1030 as shown.

The nulled-signal locating device 1020 may be implemented in accordance with various aspects of nulling locator embodiments as described herein. For example, the nulled-signal locating device 1020 may include a first transmitter node 1022 and a second transmitter node 1024, which may be positioned apart, with a locator device sensing element 1026 in between them such that the first transmitter node 1022 and second transmitter node 1022 are located an equal distance along a shared plane from the locator device sensing element 1026.

The first transmitter node 1022 and the second transmitter node 1024 may produce equal amplitude oppositely phased magnetic field signals. Direct signals from the transmitters may be nulled at a sensor point, such as area located centrally between the first transmitting node 1022 and the second transmitting node 1024 as occupied by the locator device sensing element 1026. As such, signals from the transmitters themselves may be substantially nulled or cancelled at this point, while signals from utilities or other conductors may be passed through to further utility locator processing circuitry, such as the utility locator processing elements and methods described in the incorporated applications and/or as known in the art.

As illustrated in FIG. 10B, when in the presence of a largely conductive material, such as the buried utility line 1030, current signals may be induced onto the buried utility line 1030 from the transmitted signals radiated from the transmitting elements. The resultant magnetic fields generated from the current flow in the buried utility line 1030 and signals from the first and second transmitter nodes 1022 and 1024 may be sensed by the locator device sensing element 1026, and outputs may be used by subsequent signal processing to derive information associated with the buried utility 1030, such as position, depth, orientation, and the like.

Figure 11:
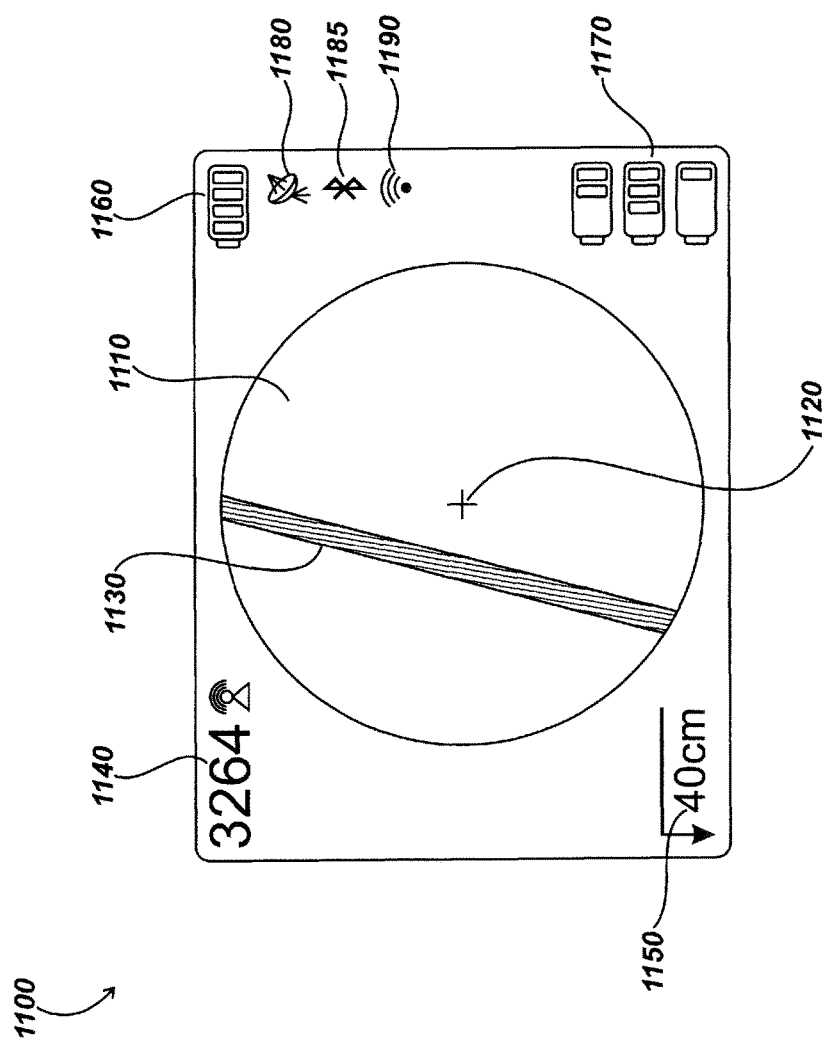
FIG. 11 is an illustration of an example user interface display for a nulled-signal locating device embodiment.

Turning to FIG. 11, when a utility line is sensed, a user interface display 1100 (and/or other user output elements such as audible or other visual elements, not shown) of a utility locator device or other sensing element, in connection with a nulled-signal locating device in accordance with aspects of the present disclosure, may be used to display various information regarding the sensed signals, system, and device information. In an exemplary embodiment, the user interface display 1100 may be largely rectangular in shape and may have a central circular locating display area 1110 surrounded by a series of icons and indicators that may be used to communicate useful information to the user. Centrally within the locating display area 1110, a reticle 1120 may be used to notate the center point of the sensed area with respect to nulled-signal locating device. A utility line 1130 may appear within the locating display area 1110 to communicate where a sensed buried utility line is located in relation to the nulled-signal locating device/user. This line may be formed on display 1100 in various ways to present specific information associated with the buried utility or other conductor.

For example, various different configurations, systems, and methods for graphically representing the location line of a sensed buried utility as may be combined in various embodiments with the disclosures herein are described in various co-assigned patents and patent applications including U.S. Provisional Patent Application No. 61/607,510, entitled DUAL SENSED LOCATING SYSTEMS & METHODS, filed on Mar. 6, 2012 and U.S. Pat. No. 7,741,848, entitled ADAPTIVE MULTICHANNEL LOCATOR SYSTEM FOR MULTIPLE PROXIMITY DETECTION, issued Jun. 22, 2010. The content of each of these applications is incorporated by reference herein in its entirety. Additional ways of graphically representing the buried utility or utilities may also be used in various embodiments. For example, various icons and indicators may be included on the user interface display 1100 to communicate pertinent information regarding the nulled-signal locating system and buried utility information. In one implementation, in the top left corner of the user interface display 1100, a signal strength indicator 1140 may be included that quantifies the strength of current sensed on a buried utility. A depth indicator 1150 may indicate corrected depth of a targeted buried utility line beneath the Earth's surface as sensed by the nulled-signal locating device.

As shown in FIG. 11 on the top right corner, a nulled-signal locating device battery indicator 1160 may be included to communicate remaining power on the battery for the nulled-signal locating device. In embodiments of a nulling locator system where the locator includes wired or wireless communication modules for electronically communicating with one or more other system and/or peripheral devices, system/peripheral device battery indicators 1170 may be provided to display information regarding remaining battery power for each wirelessly connected system/peripheral device. A GPS lock icon 1180 may also be included to communicate to the user a sufficient lock on a GPS signal or provide other positioning or time synchronization information. In some embodiments, a blinking icon may be used to indicate no GPS lock (or other timing or positioning system lock).

Other icons (not shown) may be used to communicate other location or device information. For example, other icons may include a Bluetooth icon 1185 and/or a wireless local area network icon 1190 (e.g., for Wi-Fi or cellular data connectivity) indicating use or established communication links to the device using such technologies. In the various nulled-signal locating device/system embodiments, information indicating various aspects of sensed signals, system, and device information may be displayed. For example, various information as described herein related to nulling locator and associated system functionality may be displayed graphically and/or audibly in various formats, as may information described in the incorporated applications.

Figure 12:
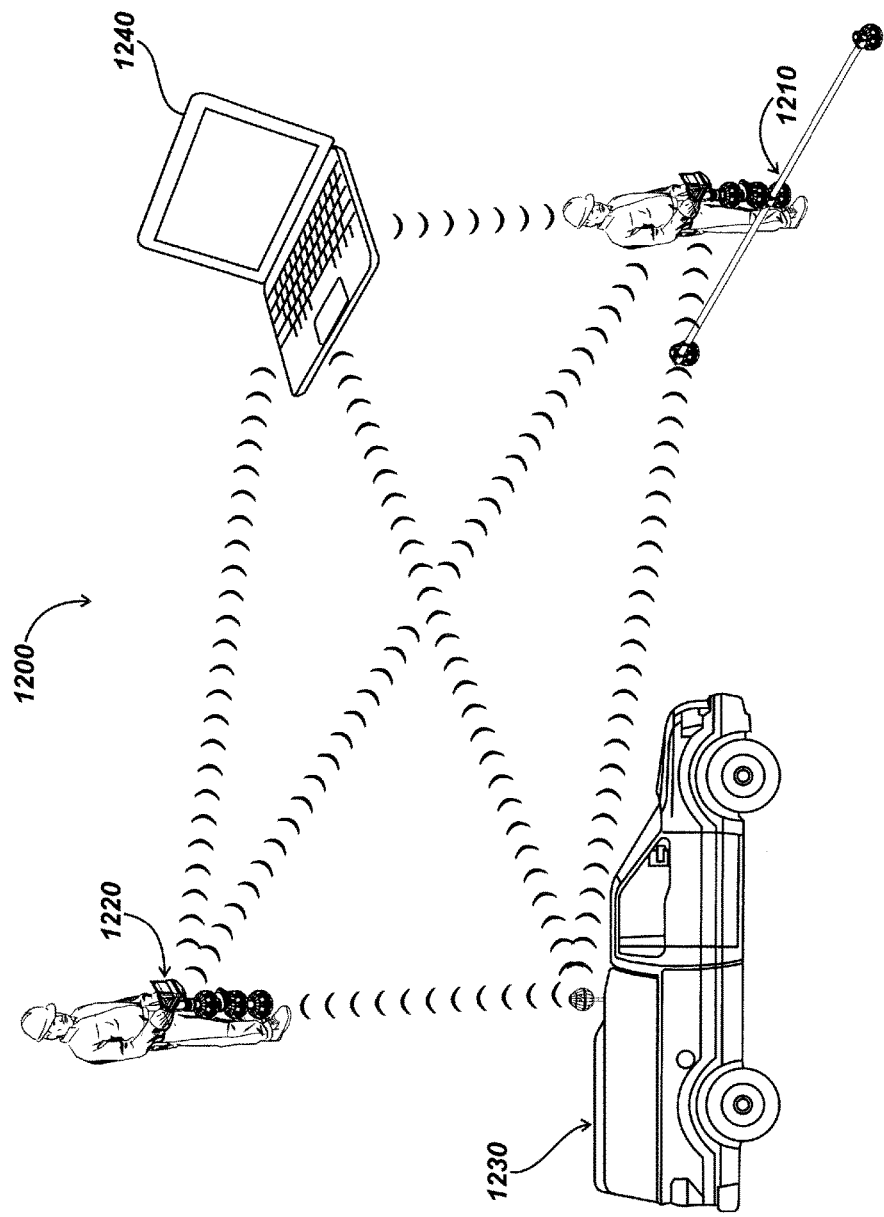
FIG. 12 is an illustration of a possible nulled-signal locating system embodiment.

Turning to FIG. 12, a system embodiment 1200 including a nulled-signal locating device in accordance with aspect of the disclosure is illustrated. In this embodiment, locating device embodiment 1200 may include one or more communication systems modules for communicating and sharing data with other devices as part of a larger utility locating system. For instance, nulled-signal locating device 1210, which may include embodiments of the various nulled-signal locating device aspects disclosed herein, may include one or more communication modules to communicate wirelessly with other utility locator devices 1220, mobile base stations 1230, and computing devices such as the laptop 1240. In such a system, the various devices may be configured with communication technology modules such as, but not limited to, wireless local area network modules such as WIFI, industrial, scientific, and medical radio (ISM), Bluetooth, cellular data, and the like modules to establish such a communication link.

The transmitted signal(s) may, in some embodiments, utilize phase and/or amplitude encoding to communicate data to sensing element(s) and/or other system devices. In some alternative nulled-signal locating systems, other devices may be configured to exchange data/communicate with a nulled-signal locating device in accordance with aspect of the present disclosure. For example, mapping systems, device, and/or technologies may be configured for communication with the nulled-signal locating system. Other devices, such as those described in the incorporated patent and patent applications and elsewhere herein, may further be configured for communication with the nulled-signal locating system using various communications modules.

In some embodiments of a nulled-signal locating device in keeping with the present disclosure, the quantity, arrangement, and/or orientation of the transmitting elements and/or sensing elements may be varied while still allowing for signal nulling or cancellation. For example, rotating of transmitting elements ninety degree inward towards the sensing element or elements may produce a similar nulling of signals. In some embodiments the sensing element(s) may be off-center from between the transmitting elements, have transmitting elements with differently sized coils and/or array configurations, and/or transmitting elements with coils containing different numbers of turns of wire and/or shapes. Software and/or firmware may be used to calibrate and adjust the devices to virtually null signals and/or adjust amplitude and/or phase of each signal by the different transmitting elements so as to null the signals. This may be done using known calibration signals and/or with other calibration or adjustment methods.

Figure 13:
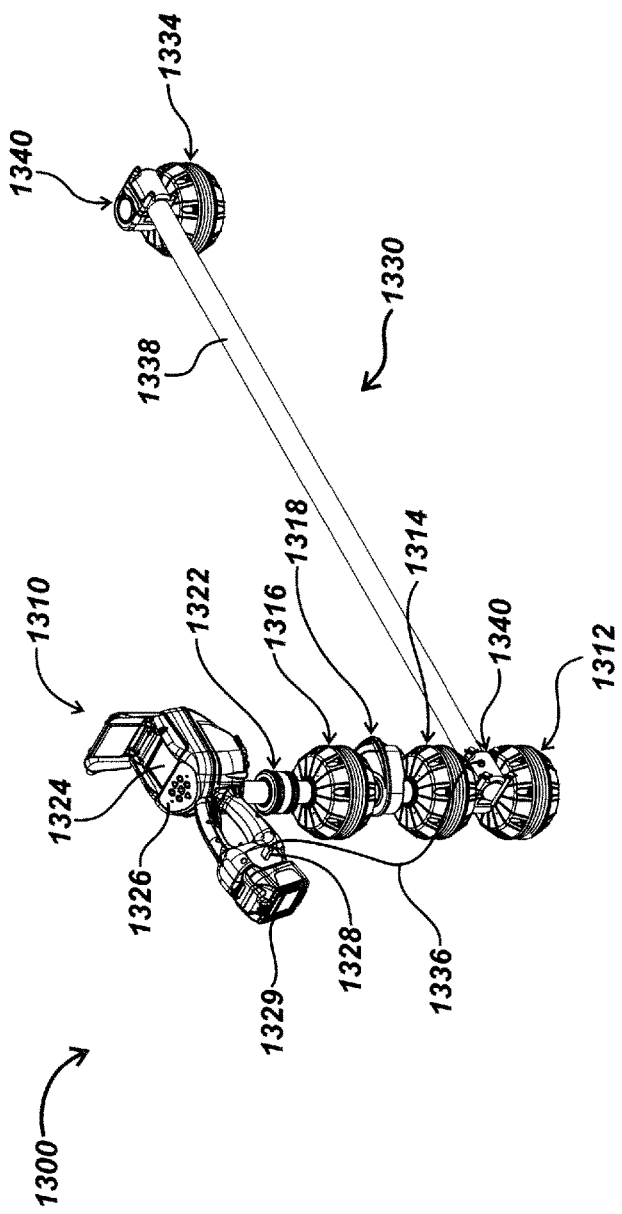
FIG. 13 is an illustration of an alternative nulled-signal locating device embodiment.

Turning to FIG. 13, some embodiments of a nulled-signal locating device, such as the nulled-signal locating device embodiment 1300, may use only one transmitting element, such as the transmitter node 1334. The nulled-signal locating device 1300 may further include a utility locator device 1310 to implement a sensing element and interface with a nulled-signal transmitter attachment device 1330. Aspects of utility locator devices that may be combined with the disclosures herein in various embodiments are described in the patents and patent applications incorporated herein.

The utility locator device embodiment 1310 may include a primary sensing node 1312 as well as a series of auxiliary sensing nodes, such as auxiliary sensing node 1314 and auxiliary sensing node 1316. In a utility locator device embodiment with multiple vertically spaced apart sensing nodes having at least one antenna, such as with the utility locator device embodiment 1310, depth of sensed utility lines may be determined using, for example, methods and apparatus as described in the incorporated application and/or as known or developed in the art.

The transmitted signal(s) of the transmitting element 1334 may be generated with a known phase relationship to the sensing nodes 1312, 1314, and/or 1316. The transmitted signal(s) may further utilize phase and/or amplitude encoding to communicate data to sensing elements and/or other system devices. In the nulled-signal locating device 1300, signals produced by the transmitting node 1334 may be nulled in the primary sensing node 1312, and/or the auxiliary sensing node 1314, and/or the auxiliary sensing node 1316 using software nulling methods such as, for example, those described subsequently herein and/or through electronic nulling methods, whereby a separate canceling or nulling signal is introduced into the antenna(s) of the various sensing nodes 1312, 1314, and 1316 to cancel the transmitted signal(s).

Still referring to FIG. 13, a separate sensor array 1318, which may include various additional sensors and devices including, but not limited to, optical sensors, acoustic sensors, mapping technologies and related sensors, and/or any of the various technologies and devices as described in the incorporated patents and patent applications or elsewhere herein.

The utility locator device 1310 and/or the nulled-signal attachment accessory 1330 may further include various internal sensors and technologies, such as those described in the incorporated patents and patent applications or elsewhere herein. For example, one or more GPS or other global navigation system receiver modules, communication modules for wirelessly communicating data to other system devices such as other utility locators, base stations, remote servers, and/or laptop/tablet computing devices, and the like. One or more user safety elements may be included in a nulled-signal locating device in keeping with the present disclosure, such as the safety flasher ring 1322 on the utility locator device 1310. Details of further aspects of a safety flasher ring embodiment as may be used are described in co-assigned U.S. patent application Ser. No. 13/851,951, entitled DUAL ANTENNA SYSTEMS WITH VARIABLE POLARIZATION, filed Mar. 27, 2013, the content of which is incorporated by reference herein in its entirety.

Still referring to FIG. 13, the utility locator device 1310 may include various elements to communicate information to a user. For example, a user interface display 1324, which may be an LCD display or other visual display device, may be used to indicate measured position, orientation, and or depth of a utility or utilities and may be further used for user input, such as through a touchscreen. In some embodiments, a nulled-signal locating device may further include other elements to communicate information to a user. For instance, a nulled-locating device may include audio and/or tactile outputs to provide audible indicators, flashing of lights, haptic feedback, and the like. Other embodiments may include various communication modules, such as Wi-Fi, Bluetooth, cellular, or other data communication technology modules as are known or developed in the art.

A utility locator device embodiment such as embodiment 1310, nulled-signal transmitter attachment device 1330, and/or overall nulled-signal locating device 1300 and associated systems may further include user input elements such as input controls 1326 as shown to provide user control and/or inputs to the device for adjustment, operational control, output control, data storage and/or transmission, and the like.

Still referring to FIG. 13, the transmitter element of a nulled-signal locating device, such as the nulled-signal transmitter attachment device 1330 of the nulled-signal locating device embodiment 1300, may be configured as an attachment accessory for a utility locator device, such as the utility locator device 1310. In such embodiments, the utility locator device 1310 may include a connector port 1328 by which a cable connector 1336 on the nulled-signal transmitter attachment device 1330 may connect for purposes of transmitting power and/or communication between the utility locator device 1310 and the nulled-signal transmitter attachment device 1330. Power may transfer from a battery 1329 on the utility locator device 1310 which may also power the utility locator device 1310. In some alternative embodiments, external batteries, separate from a battery powering the utility locator device, may be used to power the transmitting elements of a nulled-signal locating device in keeping with the present disclosure. Furthermore, other communication methods and technologies may be used to communicate information between utility locator devices and transmitter element attachments such as, but not limited to, wireless local area networks such as WIFI, industrial, scientific, and medical radio (ISM), Bluetooth, and the like. The nulled-signal transmitter attachment device 1330 of the nulled-signal locating device 1300 may include a horizontal crossbar element 1338 that the utility locator device 1310 and the transmitter node 1334 may secure to via a series of mounting brackets 1340. In some alternative embodiments, other types of fasteners, snaps, bracket, and the like may be used to secure a nulled-signal transmitter attachment device to a utility locator device. In some embodiments of a nulled-signal locating device in keeping with the present disclosure, the nulled-signal locating device may be a stand-alone device or be built into or onto a utility locator device rather than a detachable accessory.

Figure 14:
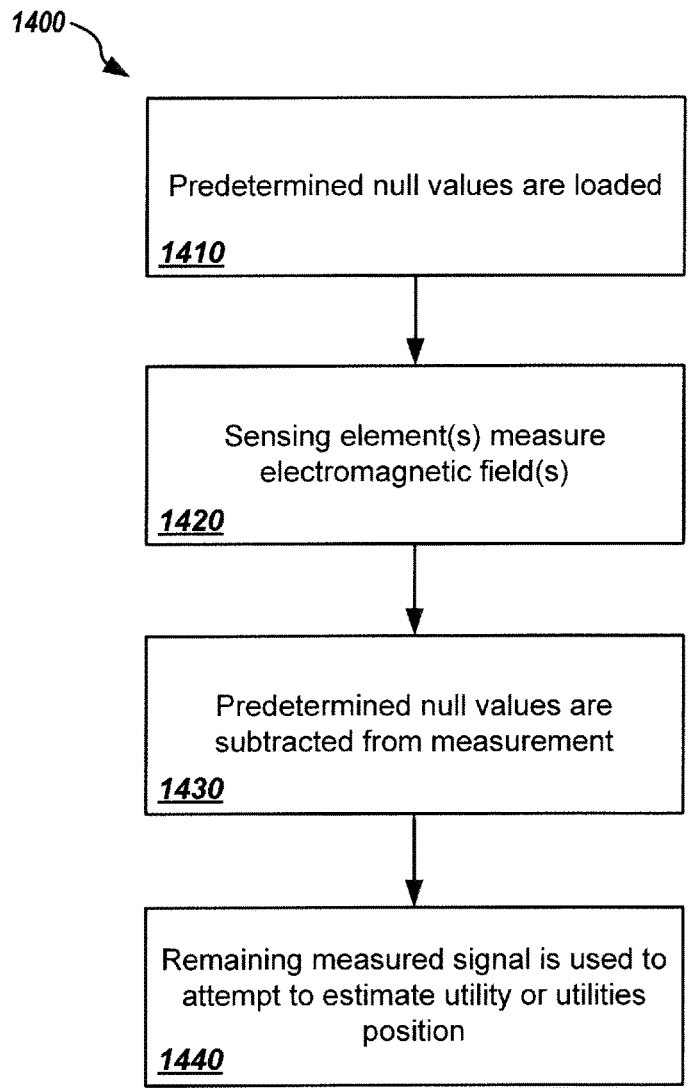
FIG. 14 is a diagram describing an embodiment of a method for use in software for nulling signals.

Nulling or cancelling of signal(s) in some embodiments may be implemented through various methods using software or firmware executing on corresponding hardware elements such as one or more processing elements. One example method embodiment is illustrated in process 1400 illustrated in FIG. 14. In process 1400, the output of one or more filters may initially be set to indicate a null value. Comparison of the sensing of a frequency other than the null value frequency may be used to indicate the presence of a buried utility or other conductor. For example, as shown in FIG. 14, in a first stage 1410, filter(s) may be set to a null value. For example, a filter may be set to a frequency of 80 kHz.

Various embodiments using such a method as described herein may filter for one or more frequencies in addition to or instead of the 80 kHz example. In stage 1420, a sensing element or elements may sense magnetic fields. At stage 1430, the predetermined null values of stage 1410 may be subtracted from the measured value(s) of stage 1420. For example, the 80 kHz filter mentioned above may ignore a measured 80 kHz signal from stage 1420. In such an instance, a determination may be made that no buried utility or other conductor is present. At stage 1440, remaining measured signal from stage 1430 may be used to estimate a buried utility position.

In some configurations, the various systems and modules include means for performing various functions as described herein. In one aspect, the aforementioned means may be a processing element including a processor or processors and associated memory in which embodiments reside, and which are configured to perform the functions recited by the aforementioned means. The aforementioned means may be, for example, processors, logic devices, memory, and/or other elements residing in a camera head, camera control module, display module, and/or other modules or components as are described herein. In another aspect, the aforementioned means may be a module or apparatus configured to perform the functions recited by the aforementioned means.

It is understood that the specific order or hierarchy of steps or stages in the processes and methods disclosed are examples of exemplary approaches. Based upon design preferences, it is understood that the specific order or hierarchy of steps in the processes may be rearranged while remaining within the scope of the present disclosure. The methods and processes herein present elements of the various steps in a sample order, and are not meant to be limited to the specific order or hierarchy presented unless explicitly noted.

In one or more exemplary embodiments, the functions, methods and processes described herein may be implemented in whole or in part in hardware, software, firmware, or any combination thereof. If implemented in software, the functions may be stored on or encoded as one or more instructions or code on a computer-readable medium in a processing element and implemented on a processor or processors, or other programmable devices, in the processing element. Computer-readable media includes non-transitory tangible computer storage media. Storage media may be any available media that can be accessed by a computer.

By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

As used herein, computer program products comprising computer-readable media including all forms of computer-readable medium except, to the extent that such media is deemed to be non-statutory, transitory propagating signals.

The various illustrative functions and circuits described in connection with the embodiments disclosed herein with respect to transmitter elements, sensing elements, associated signal processing functions, nulling circuits, and/or other functions as described herein may be implemented or performed in one or more processing elements with a general purpose processor, a special purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

Various modifications to the aspects described herein will be readily apparent to those skilled in the art, and the generic principles defined herein may be applied to other aspects without departing from the spirit or scope of the invention. Accordingly, the scope of the invention is not intended to be limited to the aspects shown herein, but is to be accorded the widest scope consistent with the specification and drawings, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use embodiments of the present invention. Various modifications to these aspects will be readily apparent to those skilled in the art, and the generic principles defined herein may be applied to other aspects without departing from the spirit or scope of the invention. Thus, the presently claimed invention is not intended to be limited to the aspects shown herein but is to be accorded the widest scope consistent with the following claims and their equivalents.

We claim:

1. A nulling utility locator, comprising:
   a transmitter element comprising:
   a signal generation circuit for generating a first transmit signal and a second transmit signal;
   a first transmit antenna element coupled to a first output of the signal generation circuit for generating a first magnetic field signal, based on the first transmit signal, for inducing a first current flow component in a buried conductor; and
   a second transmit antenna element coupled to a second output of the signal generation circuit for generating a second magnetic field signal, based on the second transmit signal, for inducing a second current flow component in the buried conductor;
   a sensing element comprising a magnetic field receiving antenna element to receive the first magnetic field signal, the second magnetic field signal, and a third magnetic field signal generated from the first and second current flow components in the buried conductor; and
   an electronic circuit for processing the received first magnetic field signal and the received second magnetic field signal to at least partially cancel each other, and determining, based at least in part on the received third magnetic field signal, information associated with the buried utility, the electronic circuit comprising an analog-to-digital converter for converting one or more output signals from the magnetic field receiving antenna element to one or more digital signals; and
   a processing element for processing the one or more received signals to at least partially cancel digital signal components of the first magnetic field signal and the second magnetic field signal by nulling, and to process digital signal components of the received third magnetic field signal to determine the information associated with the buried utility.

2. The locator of claim 1, wherein the signal generation circuit is integral with the first transmit antenna element, the second transmit antenna element, or both transmit antenna elements.

3. The locator of claim 1, wherein the signal generation circuit comprises a first signal generation element coupled to the first transmit antenna element and a second signal generation element coupled to the second transmit antenna element.

4. The locator of claim 1, wherein the second transmit signal is generated to be approximately 180 degrees out of phase with the first transmit signal.

5. The locator of claim 1, wherein the first transmit antenna and the second transmit antenna are configured so that the second magnetic field signal is radiated so as to be approximately 180 degrees out of phase with the first magnetic field signal.

6. The locator of claim 1, wherein the first transmit antenna and the second transmit antenna comprise magnetic field dipole antennas.

7. The locator of claim 6, wherein the first transmit antenna and the second transmit antenna are equally spaced from and coplanar with the magnetic field receiving antenna element.

8. The locator of claim 7, wherein the magnetic field receiving antenna element comprises an omnidirectional magnetic field antenna array.

9. The locator of claim 1, wherein the information associated with the buried utility includes positional information.

10. The locator of claim 9, wherein the positional information includes terrestrial coordinate information.

11. The locator of claim 10, wherein the terrestrial coordinate information includes latitude/longitude information.

12. The locator of claim 9, wherein the positional information includes depth information.

13. The locator of claim 1, wherein the information associated with the buried utility includes current flow magnitude information associated with a current flow in the buried utility.

14. The locator of claim 1, wherein the information associated with the buried utility includes current flow phase or directional information associated with a current flow in the buried utility.

15. The locator of claim 1, further comprising a secondary sensing element coupled to the electronic circuit, wherein the electronic circuit is configured to determine depth information associated with the buried utility based at least in part on an output signal from the secondary sensing element.

16. The locator of claim 1, further comprising an output device for providing a visual display output corresponding to the determined information associated with the buried utility including one or more of an estimated position of the buried utility and an estimated depth of the buried utility.

17. The locator of claim 16, wherein the output device further comprises an audible output device.

18. The locator of claim 17, wherein the estimated position of the buried utility and/or the estimated depth of the buried utility is presented audibly.

19. The locator of claim 16, wherein the output device further comprises a haptic feedback device.

20. The locator of claim 19, wherein the estimated position of the buried utility and/or the estimated depth of the buried utility is presented as tactile information to a user.

21. The locator of claim 1, wherein the locator includes a horizontal crossbar element coupled to a utility locator element.

22. The locator of claim 21, wherein the horizontal crossbar element includes one or more flexible/adjustable joints or rigid joints.

23. The locator of claim 1, wherein the first and/or second magnetic field signals are generated at two or more frequencies.

24. A method of locating buried utilities, comprising:
generating a first transmit signal and a second transmit signal in a nulling utility locator;
sending the first transmit signal from a first antenna element as a first magnetic field signal to a buried utility;
sending the second transmit signal from a second antenna element as a second magnetic field signal to the buried utility;
receiving, at a magnetic field receiving antenna element, the first magnetic field signal, the second magnetic field signal, and a third magnetic field signal generated from first and second current flow components induced in the buried utility from one or more of the first and second magnetic field signals;
processing, in an electronic circuit comprising an analog-to-digital converter for converting one or more output signals from the magnetic field receiving antenna element to one or more digital signals, one or more outputs of the magnetic field receiving antenna element to at least partially cancel the first magnetic field signal against the second magnetic field signal to at least partially cancel digital signal components of the first magnetic field signal and the second magnetic field signal by nulling; and
determining, based at least in part on the received third magnetic field signal, information associated with the buried utility.

25. The method of claim 24, wherein the information associated with the buried utility includes current flow magnitude information associated with a current flow in the buried utility.

26. The method of claim 24, wherein the information associated with the buried utility includes current flow phase or directional information associated with a current flow in the buried utility.

* * * * *